(12) United States Patent
Lee et al.

(10) Patent No.: US 10,572,674 B2
(45) Date of Patent: Feb. 25, 2020

(54) TERMINAL DEVICE AND METHOD FOR PROTECTING INFORMATION THEREOF

(71) Applicant: SAMSUNG ELECTRONICS CO., LTD., Suwon-si, Gyeonggi-do (KR)

(72) Inventors: Choong-hoon Lee, Yongin-si (KR); Yon-won Seo, Suwon-si (KR); Il-joo Kim, Seoul (KR); Kyoung-yong Lee, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 39 days.

(21) Appl. No.: 15/147,066

(22) Filed: May 5, 2016

(65) Prior Publication Data

US 2016/0328569 A1 Nov. 10, 2016

(30) Foreign Application Priority Data

May 8, 2015 (KR) .................. 10-2015-0064655
Apr. 15, 2016 (KR) .................. 10-2016-0045972

(51) Int. Cl.
*G06F 21/62* (2013.01)
*G06F 3/0484* (2013.01)

(52) U.S. Cl.
CPC .......... *G06F 21/62* (2013.01); *G06F 3/04847* (2013.01)

(58) Field of Classification Search
CPC ....................................................... G06F 21/62
USPC ......................................................... 726/27
See application file for complete search history.

(56) References Cited

U.S. PATENT DOCUMENTS

| | | | | |
|---|---|---|---|---|
| 2001/0037357 A1* | 11/2001 | Anzai | ............. | G11B 20/00695 709/203 |
| 2002/0016922 A1 | 2/2002 | Richards et al. | | |
| 2007/0271379 A1* | 11/2007 | Carlton | ............... | G06F 21/6263 709/225 |
| 2008/0046886 A1* | 2/2008 | Brown | ................... | G06F 21/577 718/100 |
| 2008/0165160 A1* | 7/2008 | Kocienda | ............ | G06F 3/04883 345/175 |
| 2009/0313567 A1* | 12/2009 | Kwon | ................... | G06F 3/0482 715/769 |
| 2010/0024020 A1* | 1/2010 | Baugher | ............. | G06F 21/6245 726/7 |
| 2010/0306762 A1* | 12/2010 | Lindberg | .................. | G06F 8/61 717/176 |

(Continued)

FOREIGN PATENT DOCUMENTS

| | | |
|---|---|---|
| JP | 2011-186818 | 9/2011 |
| WO | 2003/081932 | 10/2003 |

OTHER PUBLICATIONS

Search Report and Written Opinion dated Aug. 9, 2016 in counterpart International Patent Application No. PCT/KR2016/004736.

(Continued)

*Primary Examiner* — Peter C Shaw
(74) *Attorney, Agent, or Firm* — Nixon & Vanderhye, P.C.

(57) ABSTRACT

A method for protecting information of a terminal device is provided. The method for protecting information of a terminal device includes: displaying a UI element corresponding to an application; receiving a user operation of moving the UI element to a preset region; and changing an access right of the application to information pre-stored in the terminal device to an access right set in the preset region.

15 Claims, 16 Drawing Sheets

(56) References Cited

U.S. PATENT DOCUMENTS

| | | | |
|---|---|---|---|
| 2012/0054838 A1 | 3/2012 | Kim et al. | |
| 2012/0102069 A1* | 4/2012 | Okabe | G06F 17/30079 |
| | | | 707/783 |
| 2012/0124658 A1* | 5/2012 | Brudnicki | G06F 21/34 |
| | | | 726/9 |
| 2013/0031480 A1 | 1/2013 | Boss et al. | |
| 2013/0263233 A1* | 10/2013 | Dinha | H04W 12/06 |
| | | | 726/5 |
| 2013/0290708 A1 | 10/2013 | Diaz et al. | |
| 2013/0326638 A1 | 12/2013 | Zander | |
| 2014/0007222 A1 | 1/2014 | Qureshi et al. | |
| 2014/0038644 A1* | 2/2014 | Ngo | H04W 4/02 |
| | | | 455/456.3 |
| 2014/0130117 A1* | 5/2014 | Jeannot | H04L 63/08 |
| | | | 726/1 |
| 2014/0289789 A1 | 9/2014 | Poornachandran et al. | |
| 2015/0339044 A1* | 11/2015 | Matsuda | G06F 3/0488 |
| | | | 715/702 |
| 2017/0060380 A1* | 3/2017 | Huang | G06F 3/04817 |

OTHER PUBLICATIONS

Extended European Search Report dated Mar. 5, 2018 in counterpart European Patent Application No. 16792918.1.
Communication pursuant to Article 94(3) EPC dated Mar. 11, 2019 in counterpart European Patent Application No. 16792918.1.
Communication pursuant to Article 94(3) EPC dated Oct. 8, 2019 in counterpart European Patent Application No. 16792918.1.

* cited by examiner

FIG. 2A
FIG. 2B
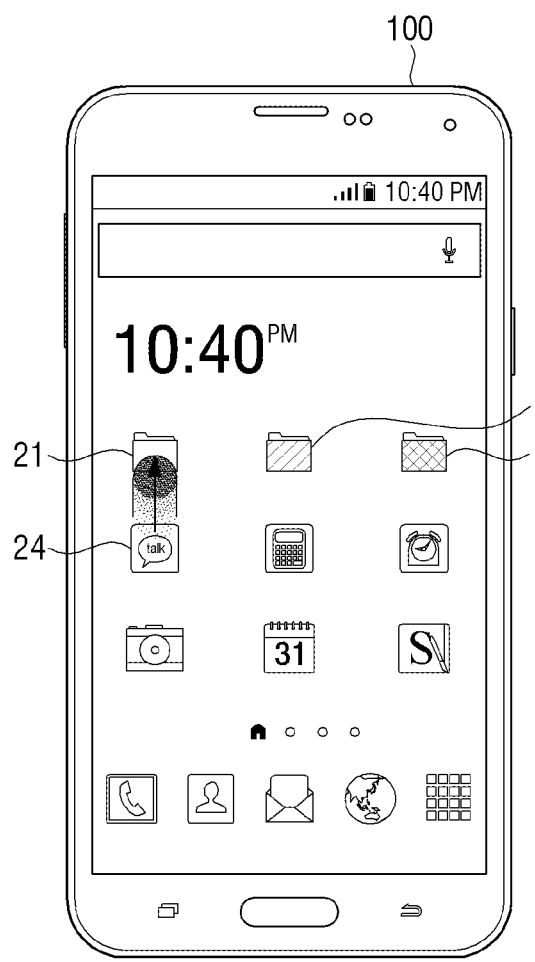
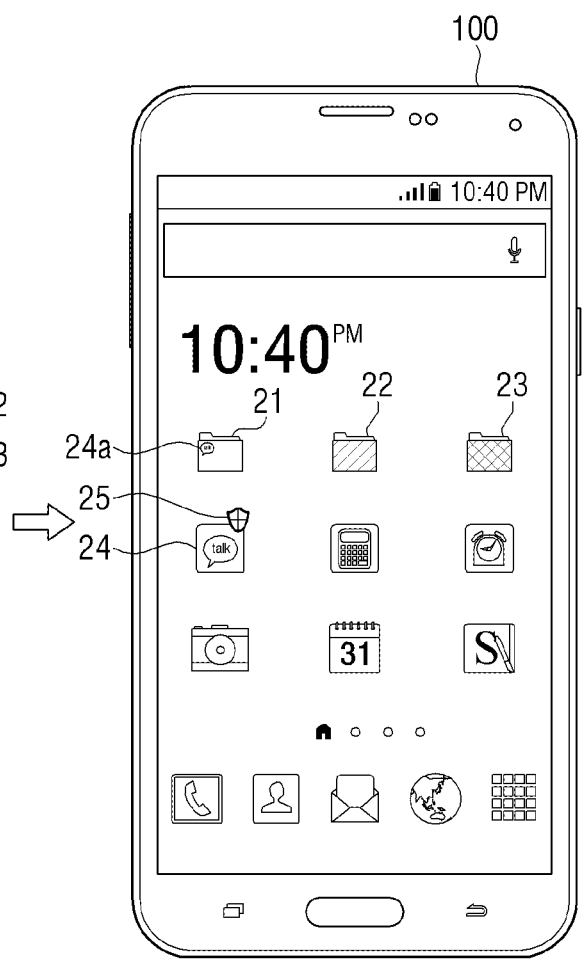

FIG. 7A
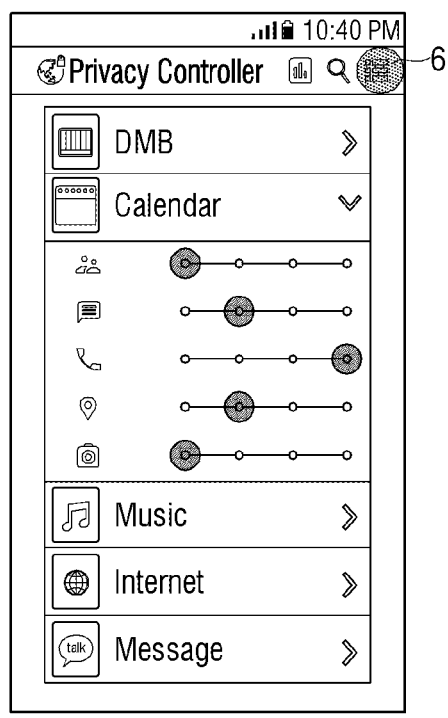
FIG. 7B
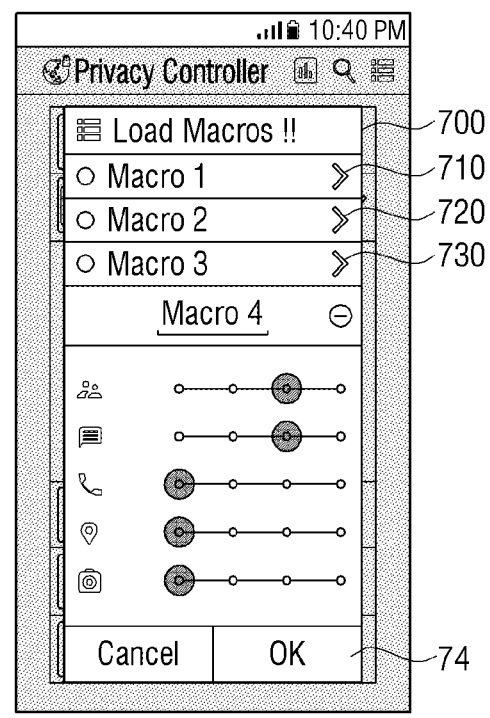

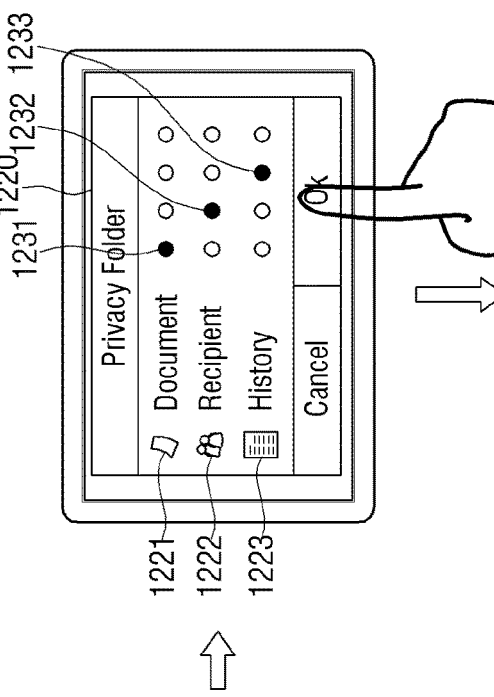
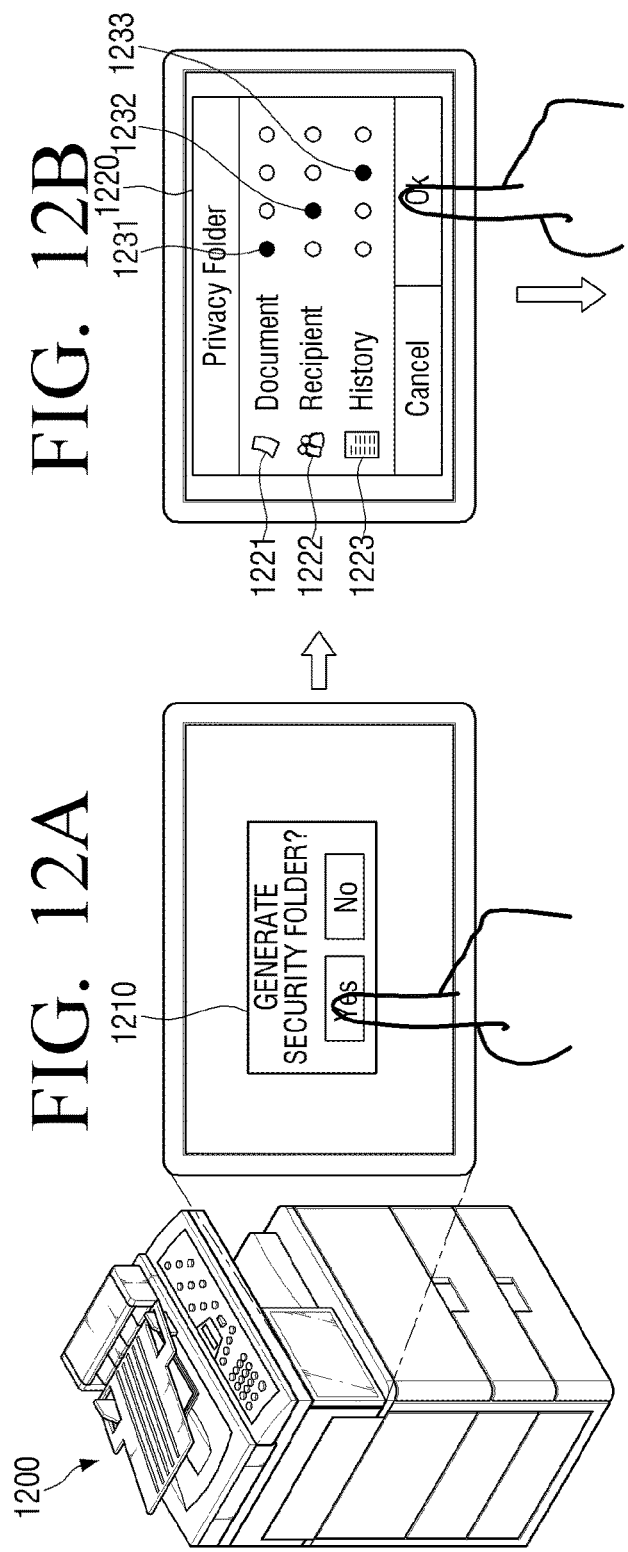
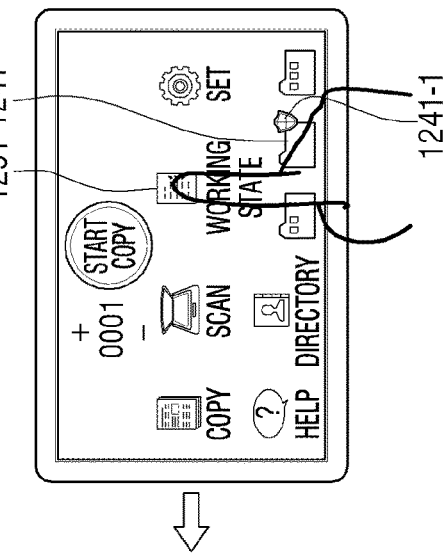
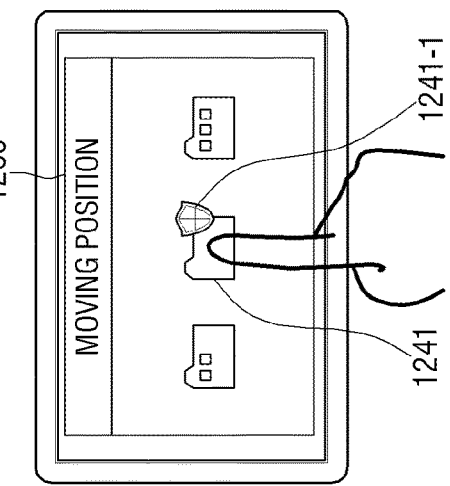
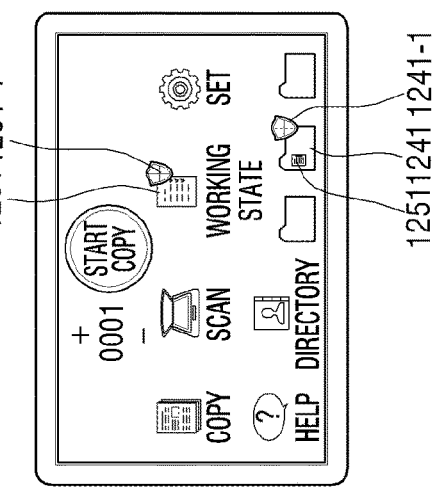

FIG. 13A  FIG. 13B
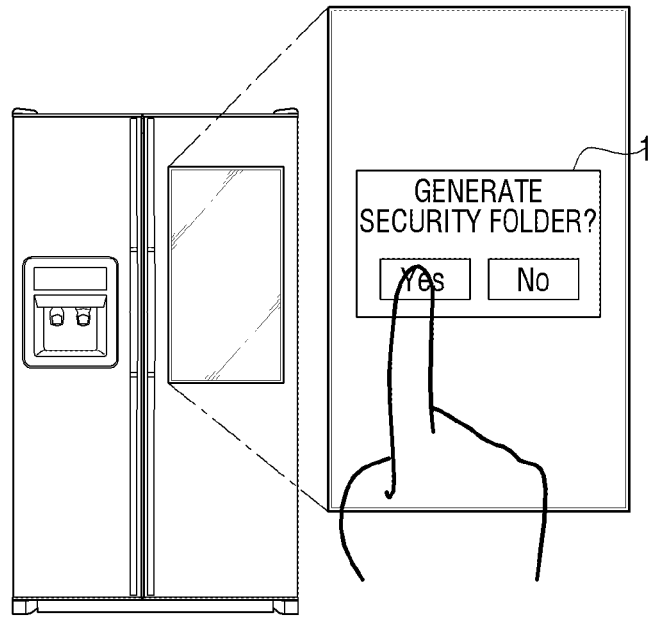
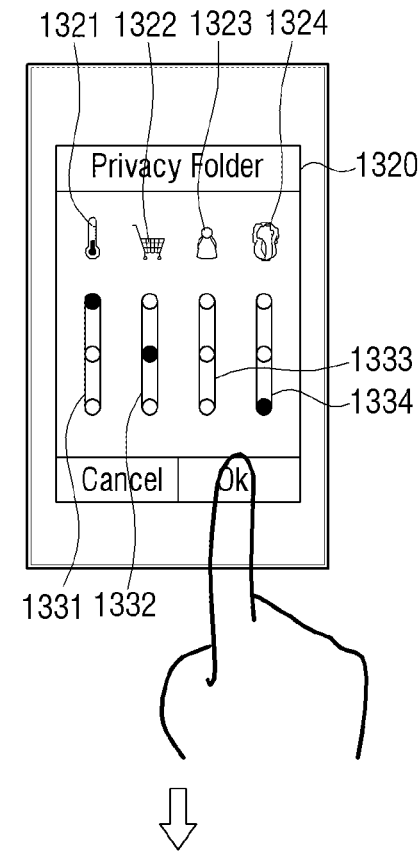
FIG. 13D  FIG. 13C
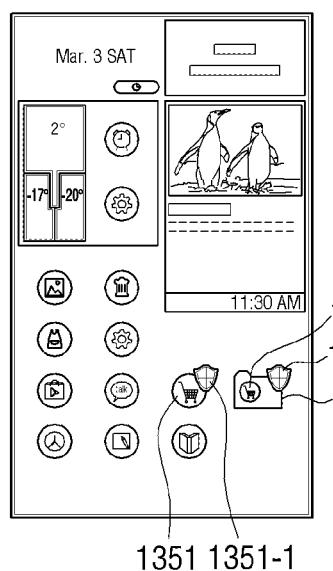
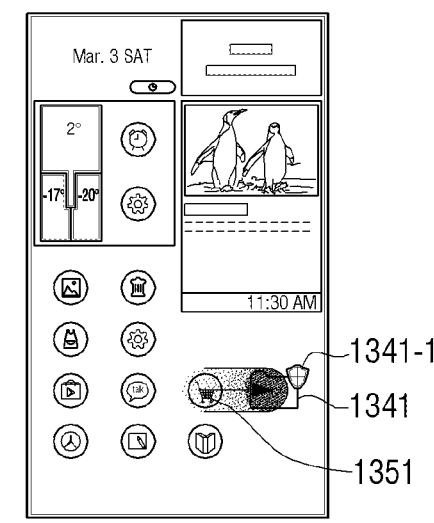

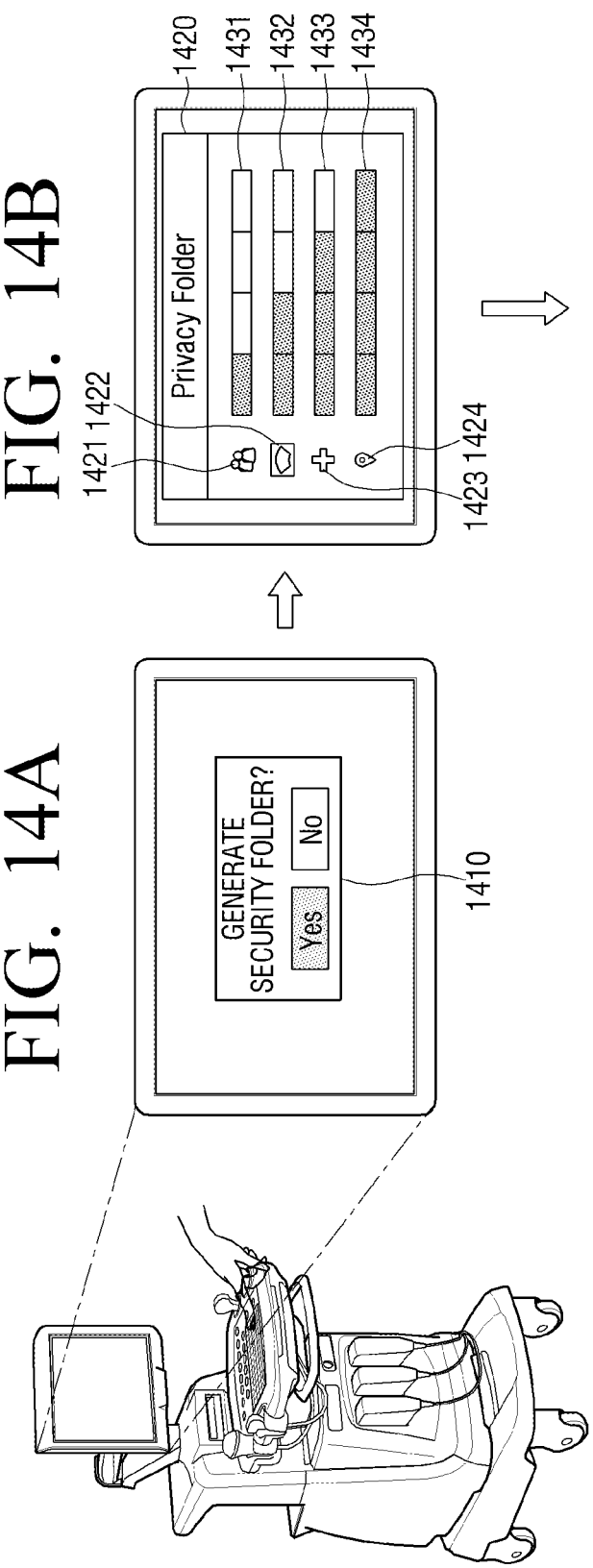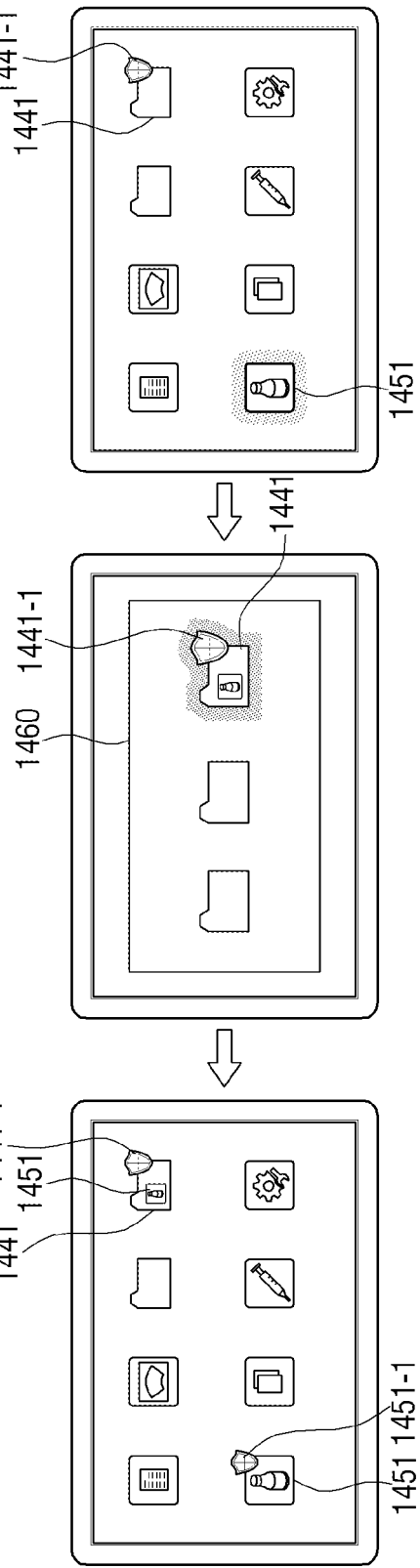

TERMINAL DEVICE AND METHOD FOR PROTECTING INFORMATION THEREOF

CROSS-REFERENCE TO RELATED APPLICATIONS

This application is based on and claims priority under 35 U.S.C. § 119 to Korean Patent Application Nos. 10-2015-0064655 and 10-2016-0045972, filed on May 8, 2015 and Apr. 15, 2016, respectively, in the Korean Intellectual Property Office, the disclosures of which are incorporated by reference herein in their entireties.

BACKGROUND

Field

Apparatuses and methods of the disclosure relate to a terminal device and a method for protecting information thereof, and for example, to a terminal device and a method for protecting information thereof capable of easily managing an access right of an application to the information stored in the terminal device.

Description of Related Art

With the development of electronic technologies, a user may receive various functions through terminal devices such as a smart phone. A user may receive more various functions by downloading and installing applications as well as functions embedded in a terminal device itself.

As such, specific applications downloaded and used request a right to access the information stored in the terminal device or collect the information. For example, a navigation application requests a right to access information on a position of a user and a phone application requests a right to access contact information stored in the terminal device. Whether to agree on the information access right may be made at the time of installation of applications. However, most users do not look around whether to agree on the information access right very carefully at the time of the installation of the applications.

However, some applications may request too many access rights to information independent of services and may maliciously collect information on which a user does not agree.

Therefore, a user is exposed to a risk of a leak of personal information stored in the terminal device in spite of himself/herself while he/she uses applications.

SUMMARY

Example embodiments of the present disclosure address the above disadvantages and other disadvantages not described above.

The present disclosure provides a terminal device and a method for protecting information thereof capable of easily managing an access right of an application to the information stored in the terminal device.

According to an aspect of the present disclosure, a method for protecting information of a terminal device includes: displaying a UI element corresponding to an application; receiving a user operation for moving the UI element to a preset first region; and changing an access right of the application to information pre-stored in the terminal device to an access right set in the preset first region.

The preset first region may correspond to an icon, a widget, a page screen different from a page screen on which the UI element is displayed, or a folder icon including a UI element of an application of which the access right is changed.

The method may further include: after the changing, continuously displaying the UI element at a displayed location before the user operation is input.

In the continuously displaying of the UI element, an identifier representing the change in the access right of the application may be displayed along with the UI element.

The preset first region may have different forms depending on the access right level set in the preset first region.

The method may further include: if the preset first region is selected, displaying an access attempt history of the application to the pre-stored information.

The method may further include: if the user operation is input, displaying a UI screen including the information on the access right set in the first region.

The changing may include: receiving the user operation of modifying the access right set in the preset first region through the UI screen; and changing the access right of the application to the modified access right.

The method may further include: if the user operation of moving the UI element to a preset second region is input, displaying a UI screen for modifying the access right of the application to the pre-stored information.

The method may further include: if the preset access right provided on the UI screen is selected, modifying the access right of the application to the selected access right.

The method may further include: if a level of the changed access right is a preset first level, encrypting the information requested by the application and providing the encrypted information to the application.

The method may further include: if a level of the changed access right is a preset second level, providing only some of the information requested by the application to the application.

The method may further include: if a level of the changed access right is a preset third level, modulating the information requested by the application and providing the modulated information to the application.

The pre-stored information may be one or more of a picture, contacts, a schedule, messages, and information on a location of the terminal device.

According to another aspect of the present disclosure, a method for protecting information of a terminal device includes: setting an access right to information pre-stored in the terminal device; and changing an access right of a specific application to the pre-stored information to the set access right.

The method may further include: limiting the access of the specific application to the pre-stored information depending on the changed access right, wherein the limiting includes providing only some of the information requested by the specific application to the specific application, modulating the information requested by the specific application and providing the modulated information to the specific application, encrypting the information requested by the specific application and providing the encrypted information to the specific application, or providing the information requested by the specific application to the specific application may be blocked.

The method may further include: storing an access attempt history of the specific application to the pre-stored information.

The changing may include: displaying a first UI element corresponding to the set access right; and receiving a user operation of moving a second UI element corresponding to the specific application to a region in which the first UI element is displayed.

According to still another aspect of the present disclosure, a terminal device includes: a display configured to display a UI element corresponding to an application; an input configured to receive a user operation of moving the UI element to a preset region; and a controller configured to change the access right of the application to the information pre-stored in the terminal device to an access right set in the preset region.

In a computer readable recording medium including a program for executing a method for protecting information of a terminal device, the method for protecting information of a terminal device may include: displaying a UI element corresponding to an application; receiving a user operation of moving the UI element to a preset region; and changing the access right of the application to the information pre-stored in the terminal device to an access right set in the preset region.

As described above, according to the example embodiments of the present disclosure, it is possible for the user to easily manage the access right of the application to the information stored in the terminal device and to reduce the risk of the leak of personal information stored in the terminal device in spite of himself/herself.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein:

FIGS. 2A, 2B, 3 and 4A to 4C are diagrams illustrating an example method for setting an access right of an application according to various example embodiments of the present disclosure;

FIGS. 6A, 6B, 7A and 7B are diagrams illustrating an example method for setting an access right of an application according to another example embodiment of the present disclosure;

FIGS. 12A-12E, 13A-13D and 14A-14E are diagrams illustrating examples for setting an access right of an application according to various example embodiments of the present disclosure.

DETAILED DESCRIPTION

The example embodiments may be variously modified and have several forms. Therefore, various embodiments of the present disclosure will be illustrated in the accompanying drawings and be described in detail in the present description. However, it is to be understood that the present disclosure is not limited to a specific example embodiment, but includes all modifications, equivalents, and substitutions without departing from the scope and spirit of the present disclosure. When the detailed description of the known art related to the present disclosure may be deemed to obscure the gist of the present disclosure, a detailed description thereof may be omitted.

Terms 'first', 'second', and the like, may be used to describe various components, but the components are not to be construed as being limited by the terms. The terms are used to distinguish one component from another component.

Terms used in the present description are used only in order to describe various example embodiments rather than limiting the scope of the present disclosure. Singular forms are intended to include plural forms unless the context clearly indicates otherwise. It will be further understood that the terms "comprises" or "configured of" used in this description, specify the presence of features, numerals, steps, operations, components, parts mentioned in this description, or a combination thereof, but do not preclude the presence or addition of one or more other features, numerals, steps, operations, components, parts, or a combination thereof.

In the example embodiments of the present disclosure, a 'module' or a 'unit' performs or is configured to perform at least one function or operation and may be implemented by hardware (e.g., circuitry), firmware or software or a combination of the hardware and the software. Further, a plurality of 'modules' or a plurality of 'units' may be integrated into at least one module except for the 'module' or 'unit' which needs to be implemented by specific hardware and thus may be implemented by at least one processor (e.g., including processing circuitry) (not illustrated).

Hereinafter, example embodiments of the present disclosure will be described in greater detail with reference to the accompanying drawings.

Figure 1:
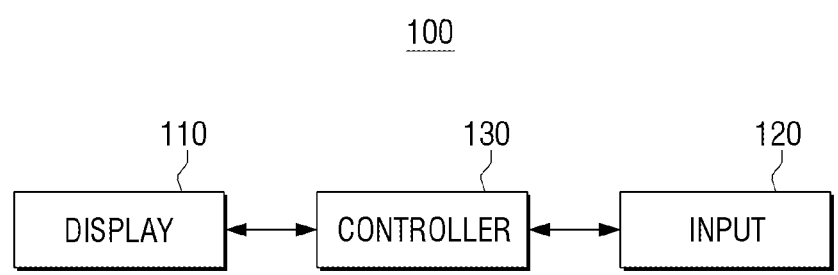
FIG. 1 is a block diagram illustrating an example configuration of a terminal device according to an example embodiment of the present disclosure.

FIG. 1 is a block diagram illustrating an example of a basic configuration of a terminal device for describing various example embodiments of the present disclosure.

A terminal device 100 of FIG. 1 may be implemented as various types of devices such as TV, a PC, a laptop PC, a cellular phone, a tablet PC, a PDA, an MP3 player, a kiosk, a digital photo frame, and a table display device, or the like. Further, the terminal device 100 may be implemented as various types of terminal devices such as a set top box, a smart watch, a wearable apparatus, an image forming apparatus, home appliances (for example, food storage apparatus, air conditioner, cleaner, oven, microwave range, washing machine, or air cleaner), medical instruments (for example, medical imaging apparatus or medical measuring apparatus (blood sugar measuring device, heart rate measuring device, blood pressure measuring device, body temperature measuring device, or the like)), vehicle infortainment apparatus, electronic equipment for ship (for example, navigation device for ship, gyrocompass, or the like), avionics, security equipment, a head unit for vehicle, an industrial or domestic robot, a drone, ATM of financial institution, point of sales of shop, an internet of things apparatus (for example, bulb, various sensors, spring cooler, fire alarm, thermostat, streetlight, toaster, sport outfit, hot water storage tank, heater, boiler, or the like), or the like.

The terminal device 100 may be a device that may set an access right of an application to information stored in the terminal device 100. For example, setting of the access right may, for example, refer to how much the application accesses the stored information to use or collect the information. For example, if the access right is set at the highest level, the application may access and use the information stored in the terminal device 100 without limit and if the access right is set at the lowest level, the application may not access the information stored in the terminal device 100 at all.

For example, the terminal device 100 may process information requested by the application depending on the set access right to provide the processed information to the application or may prevent the information requested by the application from being provided to the application. By doing so, it is possible to protect the information pre-stored in the terminal device 100.

For example, the information pre-stored in the terminal device 100 includes a concept of including information temporarily generated and stored as well as information non-temporarily stored in the terminal device 100 and may also be called the information stored in the terminal device 100 or the information generated in the terminal device 100. For example, the temporarily generated information such as location information of the terminal device 100 or motion sensing information of the terminal device 100 is also included in the information and information such as an address book (contacts), a message, a call record, and a picture/media/file stored in the terminal device 100 may also be included in the information. Further, according to various example embodiments of the present disclosure, it is possible to protect the information even in the case in which the information is stored in an external repository (for example, SD card) connected to the terminal device 100 as well as the case in which the information may be stored in a memory embedded in the terminal device 100.

Referring to FIG. 1, the terminal device 100 includes a display (e.g., including a display panel) 110, an input (e.g., including input circuitry) 120, and a controller (e.g., including processing circuitry) 130.

The display 110 displays various graphic objects. For example, the display 110 may display a screen including UI elements corresponding to applications stored in the terminal device 100. The UI element corresponding to the application may, for example, be an icon for executing an application.

The UI elements may be displayed on a page screen. The page screen may, for example, refer to a screen which may be turned like a page of a book depending on a user operation. In general, one page screen may be displayed on the display 110, but in some cases, a plurality of page screens may also be displayed on the display 110.

The input 120 is configured to receive the user operation. For example, the input 120 may receive a user operation of moving a UI element displayed on the display 110 to a specific region.

The display 110 and the input 120 may be combined with each other and thus may be implemented in a form of a touch screen. In this example, the touch screen may determine a form of a user touch operation based on a sensing signal sensed by a touch sensor. As the touch operation, there may be various operations such as a simple touch, a tap, a touch and hold, a move, a flick, a drag and drop, a pinch in, and a pinch out, etc.

The user operation of moving the UI element to the specific region may be, for example, an operation of dragging and dropping a UI element to a specific region. Alternatively, the user operation may be an operation of touching a UI element and then touching a region to which the user wants to move the UI element within a preset time. The user operation is not limited thereto, and therefore the user operation of moving the UI element to the specific region may have many various forms.

The controller 130 is configured to control an overall operation of the display device 100. The controller 130 may execute an operating system (O/S) or various applications stored in a memory included in the terminal device 100 to control operations of each of the hardware elements included in the terminal device 100 and to support various functions.

For example, the controller 130 may set an access right of an application to the information stored in the terminal device 100 by various schemes.

For example, the controller 130 may apply an access right preset by the user to a specific application. For example, the specific application may be called any application. Applying the preset access right means that the access right of the specific application is changed to the preset access right. Further, the preset access right may also be applied to several applications depending on the user operation at a time.

As another example, the controller 130 may set each of the access rights of the applications depending on the user operation.

According to various example embodiments of the present disclosure, to easily set the access right of the application, the controller 130 provides various user interface (UI) screens. For example, a security region may be provided on the screen of the display 110 and the controller 130 may set the access right of the application by user interaction for the security region.

The user interaction for the security region may include an operation of allowing a user to move a UI element of an application in which an access right will be set to the security region.

The term to be used in the present specification "security region" may, for example, refer to the preset region on the screen of the display 110. The security region may, for example, be a region which a specific graphic object is displayed. For example, the security region may be a region in which an icon, a widget, and a folder icon including the UI element of the application are displayed. However, the security region is not limited thereto, and therefore the security region may also be a region in which the graphic object is not displayed. For example, the security region may be defined as an edge region of the screen. Alternatively, the security region may be a specific page screen.

Hereinafter, referring to FIGS. 2A, 2B and 3, example embodiments in which the access right of the application is changed to the preset access right for the security region will be described.

Referring to FIGS. 2A and 2B, the security region may be a region in which a specific icon is displayed. For example, the security region may be a region displayed in the folder icon form. If a user operation of moving a UI element 24 of A application to a first security region 21 is input through the input 120, an access right of the A application may be changed to an access right set in the first security region. The UI element of at least one application may move to one security region and the same access right may be applied to applications corresponding to the UI elements moving to the same security region.

The security region may have different forms depending on levels of the access right set in the security region. As illustrated in FIG. 2A, the first security region 21, a second security region 22, and a third security region 23 may have different forms. For example, the access right level may be divided into "None", "Low", "Mid", and "High", in which a color of the security region in which the access right level is set as None may be green, a color of the security region in which the access right level is set as Low may be yellow, a color of the security region in which the access right level is set as Mid may be orange, and a color of the security region in which the access right level is set as High may be red. By doing so, the user may intuitively understand the access right level set in the security region.

The user may also look at the form of the security region to understand the access right level set in the security region, but according to another example embodiment of the present disclosure, the UI element may move to the security region, and at the same time the UI screen including the information on the access right set in the security region may also be displayed in a notification window form. The user may check the notification window to more specifically understand the information on the access right set in the security region.

Meanwhile, even after the UI element 24 of the A application moves to the first security region 21, as illustrated in FIG. 2B, the UI element 24 of the A application originally remains at the existing position. Therefore, the user may select the existing position to execute the A application. Alternatively, the user selects the first security region 21 and then selects a UI element 24a of the A application included therein, thereby executing the A application.

If the access right of the A application is changed, an identifier 25 notifying that the access right for the A application is changed may be displayed along with the UI element 24 of the A application.

Meanwhile, after the UI element 24 of the A application moves, the UI element 24a notifying that the A application is included in the first security region 21 may be displayed.

A UI element of another application (B application) may move to be included in the first security region 21 including the UI element 24a corresponding to the A application in which the access right is changed, such that the A application and the B application have the same access right.

Figure 3:
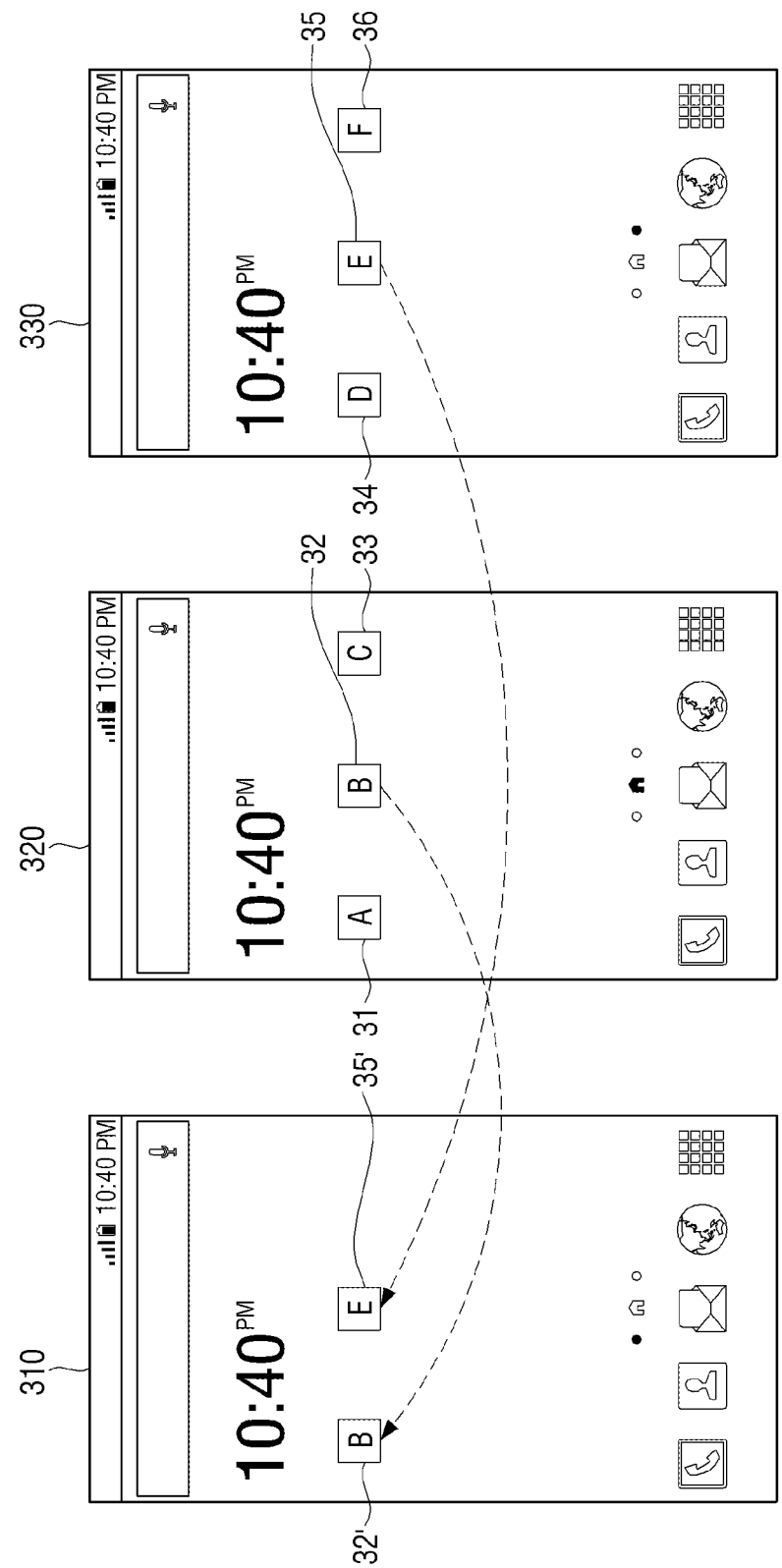

FIG. 3 is a diagram illustrating an example security region having a different form from that of FIGS. 2A and 2B.

Referring to FIG. 3, the terminal device 100 may provide page screens 310, 320, and 330 which may display UI elements of an application. Among those, the first page screen 310 may correspond to the security region.

If a user operation of moving a 'B' UI element 32 and an 'E' UI element 35 which are being displayed on the second page screen 320 and the third page screen 330 to the first page screen 310 is input, the controller 130 may change access rights of the B application corresponding to the 'B' UI element 32 and an E application corresponding to the 'E' UI element 35 to the access right set in the first page screen 310.

As described with reference to FIGS. 2A, 2B and 3, according to various example embodiments of the present disclosure, the access right of the application may be changed by a simple operation and the same access right may be applied to the applications included in the security region.

Meanwhile, according to example embodiments of the present disclosure, the user may directly generate a security region having an access right that he/she wants. The generation of the security region will be described below with reference to FIGS. 4A-4C.

Figure 4A:
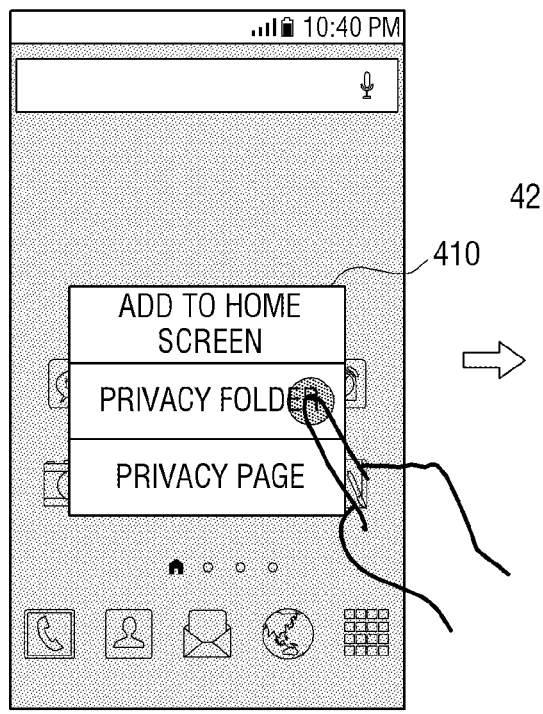

Referring to FIG. 4A, if the preset user operation is input, the controller 130 may display a UI screen 410 for generating a security region on the display 110. As illustrated in FIG. 4A, the user may select a security region type. The security region type may be the folder icon type as illustrated with reference to FIG. 2 and may be a page screen type as described with reference to FIG. 3.

Figure 4B:
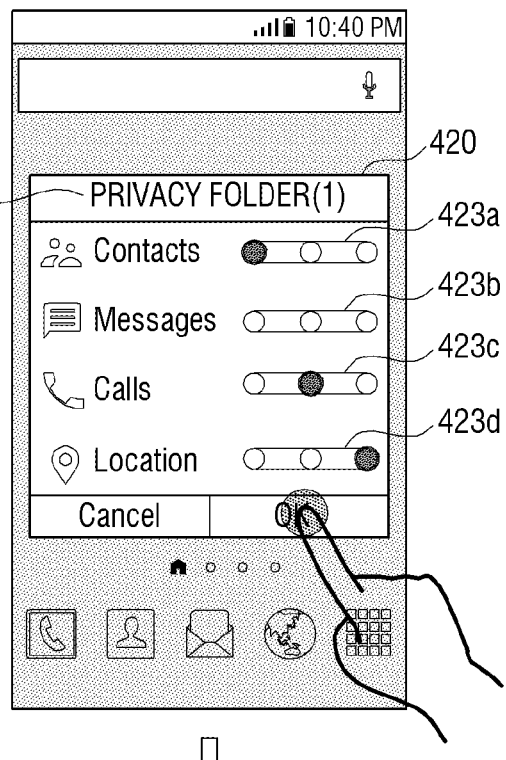

If the user selects the security region type as illustrated in FIG. 4A, as illustrated in FIG. 4B, the controller 130 may control the display 110 to display an access right setting UI screen 420 which may set an access right level in detail.

The user may set an access right level to be applied to a security region to be generated by using the access right setting UI screen 420.

According to this example embodiment of the present disclosure, the access right may be set for a variety of information. For example, an access right of information such as contacts, messages, a call, and a location may be set and may be set even at various levels. According to an example, the access right level may be divided into four levels.

If the access right level is set at a first level, the application may access the information without limit.

If the access right level is set at a second level, the controller 130 may provide only some of the information requested by the application to the application. For example, if the application requests an access to the contacts, the controller 130 may provide only information other than the last digits of a telephone number to the application. Alternatively, if the application requests an access to the messages, the controller 130 may provide only a message text other than information on a message receiver/sender to the application. Alternatively, if the application requests an access to the location information of the terminal device 100, the controller 130 may not provide an accurate location but only approximate location information to the application. For example, if the accurate location of the terminal device 100 is 16 Batchelder Rd, Marblehead, Mass., and USA, the controller 130 may provide only the Marblehead, the MA, and the USA to the application. According to an example embodiment of the present disclosure, complete information may not be provided to the application and therefore a sensitive portion of the information may be protected.

If the access right level is set at a third level, the controller 130 may encrypt the information requested by the application and provide the encrypted information to the application. For example, if the application requests an access to the file stored in the terminal device 100, the controller 130 may encrypt the file and provide the encrypted file to the application. If the application has a function of uploading the file stored in the terminal device 100 into an external server, there is a risk that a service provider may see the file uploaded into the external server. However, if the encrypted file is uploaded as in the present example embodiment, the service provider may not open the uploaded file. Further, if the user reads the uploaded file again, the controller 130 may decrypt the encrypted file. Therefore, according to the present example embodiment, it is possible to get higher protective strength of information.

If the access right level is set at a fourth level, the controller 130 may entirely prevent the application from being accessed to the information.

The user may control the above-mentioned various access right levels based on the UI provided by the access right setting UI screen 420. To this end, for example, a plurality of bars corresponding to each of the pre-stored information as illustrated in FIG. 4B may be provided.

In FIG. 4B, it may be understood that a contacts access right setting bar 423a corresponds to the second level, a message access right setting bar 423b corresponds to the first level, a call access right setting bar 423c corresponds to the third level, and a location access right setting bar 423d corresponds to the fourth level. In this example, the user may select one of the plurality of bars to determine the access right levels for each of the pre-stored information.

Meanwhile, the access right level is named the first to fourth levels, which is to represent that each of the levels is different. Therefore, the access right level is not limited to the above name.

Further, the user may also modify a name 421 of a folder in the access right setting UI screen 420.

Figure 4C:
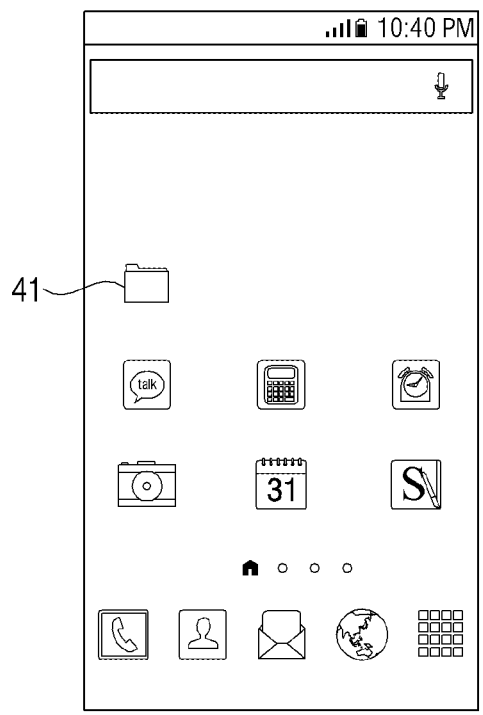

If the access right setting is completed, as illustrated in FIG. 4C, a security region 41 to which the setting is applied is generated. If the UI elements move to the security region 41, the access rights of the applications corresponding to the moving UI elements may be changed to the access rights set as illustrated in FIG. 4B.

Meanwhile, the setting of the access right to the so generated security region may also be modified without limit by the user operation later. The access right set in the security region may be modified by various schemes. As an example, if a user operation of performing a double tap on the security region is input, the UI screen for modifying the access right set in the security region may be displayed.

As another example, if the user operation of moving the UI element to the security region is input, the UI screen for modifying the access right set in the security region may be displayed. For example, the UI screen may be a similar form to the access right setting UI screen 420 illustrated in FIG. 4B. The user operation of modifying the access right set in the security region may be input through the UI screen. If the access right set in the security region is modified by the user operation, the access right of the application corresponding to the UI element moving to the security region may also be modified accordingly.

Meanwhile, the foregoing example embodiment describes that the user directly sets the access right manually but may select the preset access right to more easily set the access right.

According to another example embodiment of the present disclosure, the user may receive a variety of information through the security region. As one example, the user may receive information on an access attempt history of the application to the information pre-stored in the terminal device 100.

For this purpose, according to an example embodiment of the present disclosure, if the user operation of selecting the security region is input, the controller 130 may control the display 110 to display the access attempt history of the application moving to the selected security region to the information pre-stored in the terminal device 100. According to another example embodiment of the present disclosure, if the user operation of selecting the security region is input, the controller 130 may control the display 110 to display the limited access history of the application to the information depending on the access right set in the selected security region.

To this end, an icon which may check the access attempt history to the information may be provided in the security region. The present example embodiment will be described with reference to FIG. 5A.

Figure 5A:
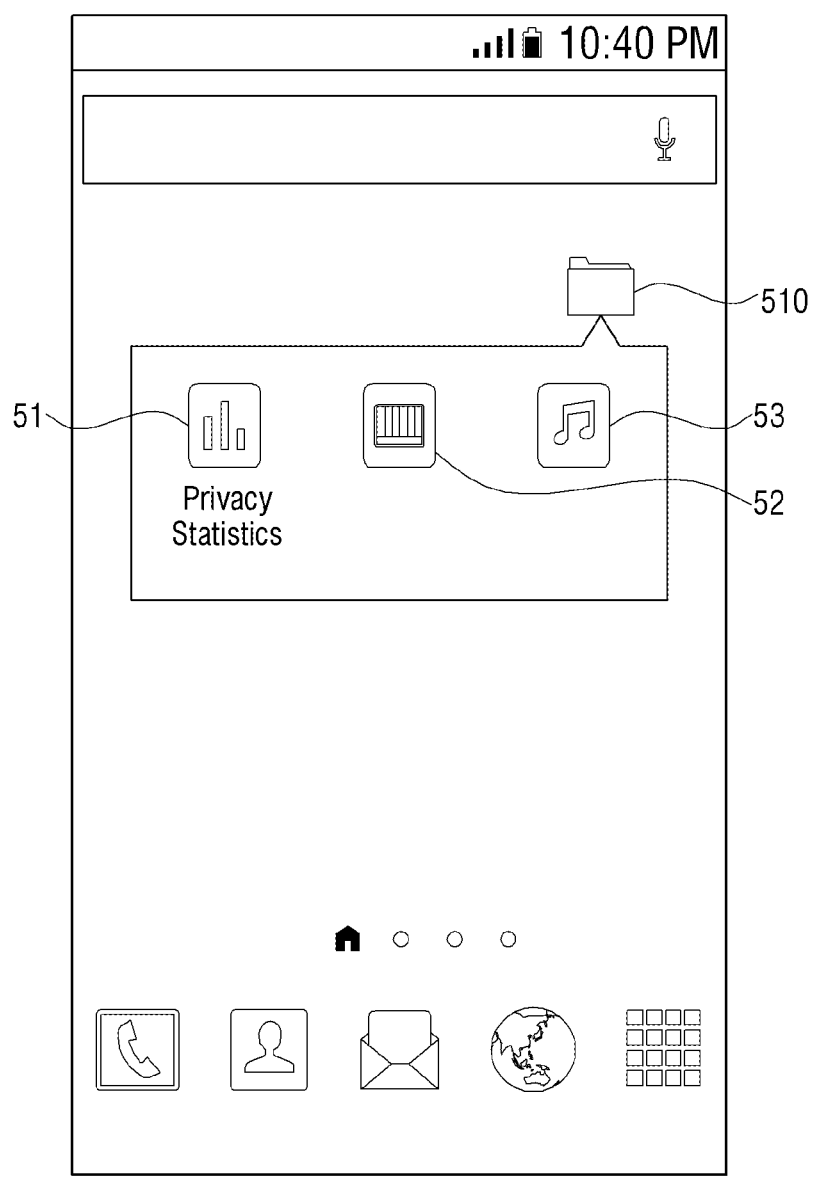
FIGS. 5A to 5C are diagrams illustrating an example method for providing a history with a limited information access according to various example embodiments of the present disclosure.

Referring to FIG. 5A, if a security region 510 is selected, along with UI elements 52 and 53 moving to the security region, a history checking icon 51 which may check an access attempt history of applications corresponding to the UI elements 52 and 53 to the information stored in the terminal device 100 may be displayed.

If the history checking icon 51 is selected, the access attempt history of the applications corresponding to the UI elements within the security region 510 to the information is displayed.

Figure 5B:
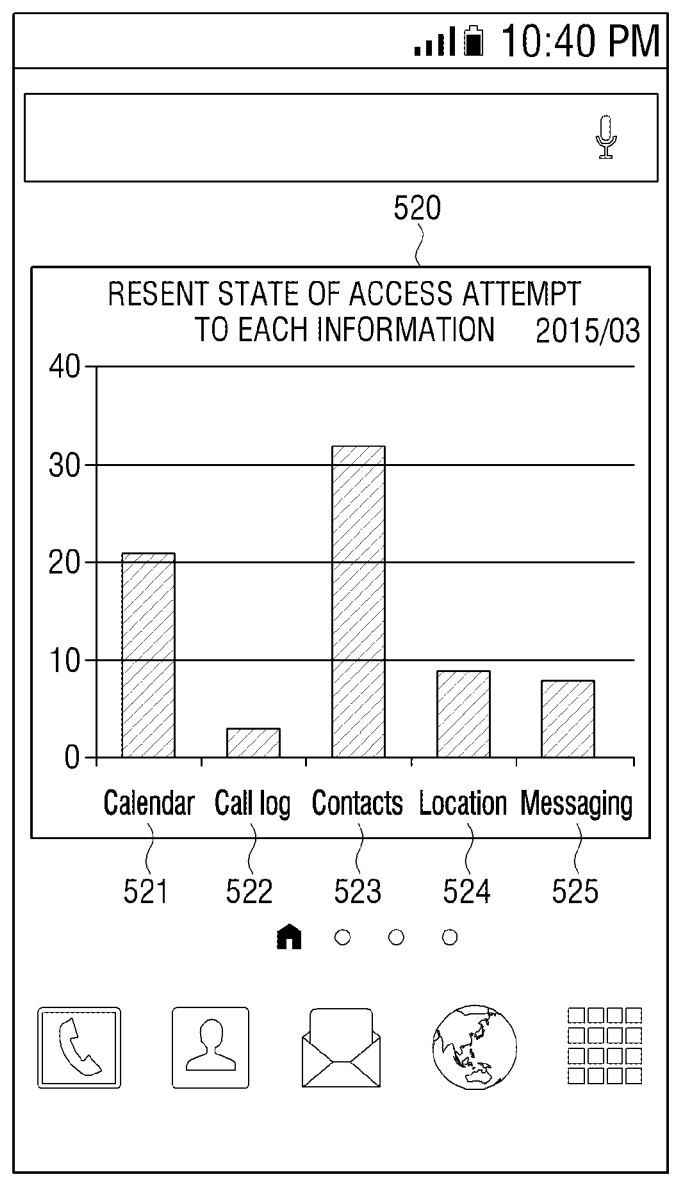

According to an example embodiment of the present disclosure, if the history checking icon 51 is selected, as illustrated in FIG. 5B, a screen 520 representing the present condition of access attempts to each information may be displayed. The attempt frequency of the application to access the information may be displayed for each information type such as scheduling information 521, call record information 522, contacts information 523, location information 524, and message information 525. In this example, the access attempt frequency is determined for a specific application but may be determined for all the applications within a security region 410.

Figure 5C:
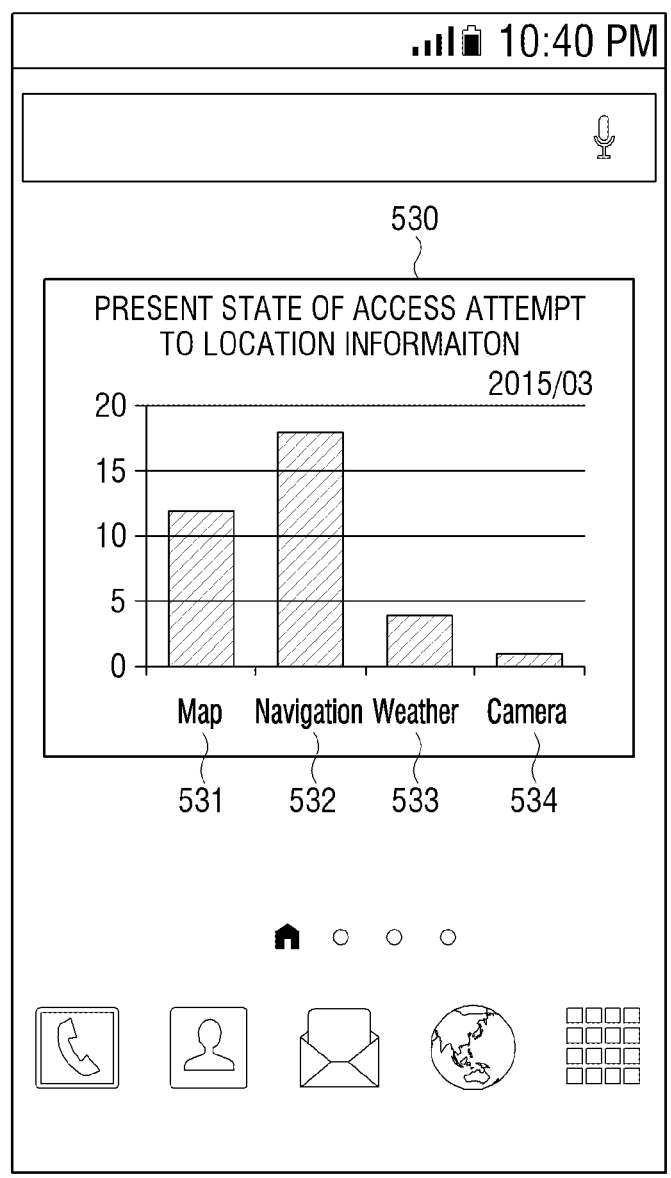

According to an example embodiment of the present disclosure, if the history checking icon 51 is selected, as illustrated in FIG. 5C, a screen 530 representing the present condition of the access attempt of the application to the specific information (for example, location information) may be displayed. FIG. 5C illustrates an example in which when UI elements corresponding to a map application 531, a navigation application 532, a weather application 533, and a camera application 534 are present within the security region 510, the present condition of the access attempt to the location information is shown.

As described above, by providing the access attempt history to the information, the user may understand what information any application attempts to access and how often the application accesses the information.

Meanwhile, the foregoing example embodiment describes that the access attempt history of the application to the information is provided. However, according to another example embodiment of the present disclosure, the limited access history of the application to the information is provided depending on the access right set in the security region.

According to another example embodiment of the present disclosure, it is possible to check the access right of the application to the information stored in the terminal device by the simple operation and modify the access right.

To this end, the operation of moving the UI element to the security region may be performed. According to the present example embodiment, unlike one described in FIGS. 2A to 5C, the security region serves as shortcut for displaying the UI screen which may check or modify the access right of the application. The present example embodiment will be described below in more detail with reference to FIGS. 6A-6B and 7B.

Figure 6A:
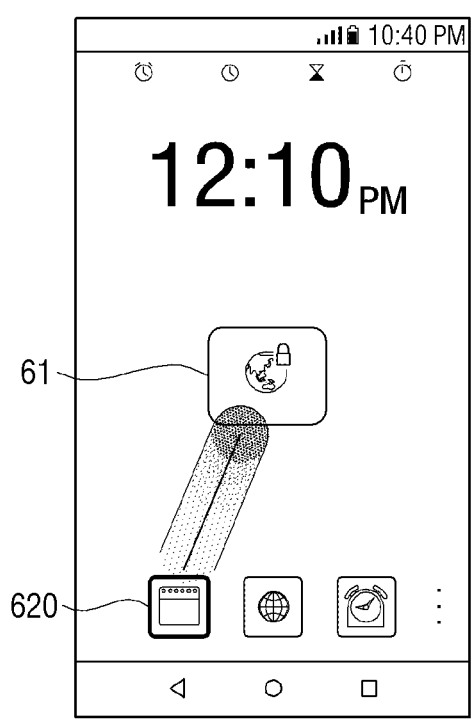
Figure 6B:
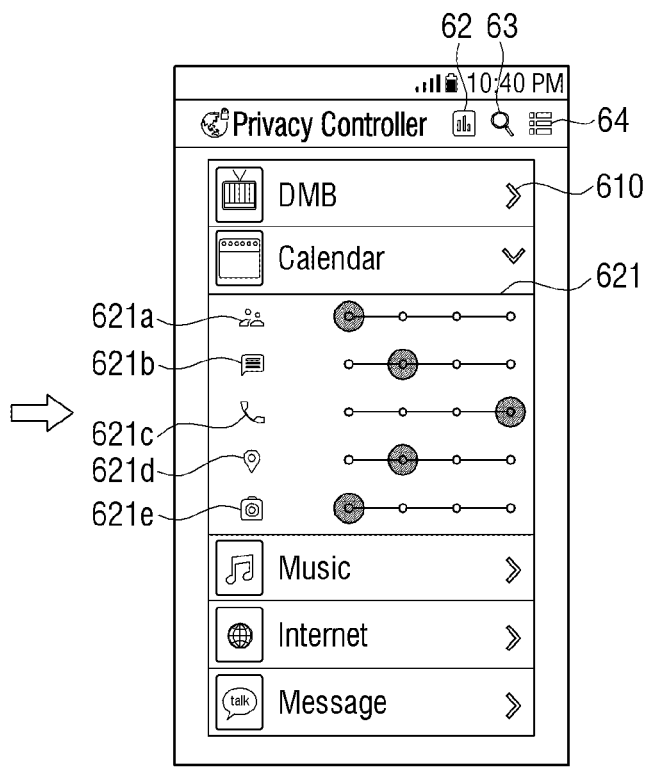

Referring to FIG. 6A, if a user operation of moving a UI element 620 of A application to a security region 61 is input, an edit UI screen which may check and/or modify the access right of the A application to the information stored in the terminal device 100 may be displayed. In the edit UI screen, the access right of other applications as well as the A application may also be checked and/or modified. FIG. 6B illustrates an example of the edit UI screen.

In the edit UI screen of FIG. 6B, details 621 of the access right of the A application (calendar application) corresponding to the UI element 620 moving to the security region 61 are provided. For example, the access right of the calendar application to information on contacts 621a, messages 621b, a call 621c, a location 621d, and a picture 621e is displayed.

The user may control bars corresponding to each information to control access right levels for each information. If it is considered that the access right level of the calendar application for the information on, for example, the call 621c is set to be too high, the user may control the access right level to be low.

Further, the user may check and/or modify the access right of other applications as well as the calendar application in the edit UI screen as illustrated in FIG. 6B. If the user wants to check and/or modify the access right of the DMB application, he/she may select a check button 610 for the DMB application.

Further, the user may also check the access attempt history to the information through the edit UI screen. If the history check button 62 is selected, the present condition of the information access attempt like the examples described in FIGS. 5B and 5C may be displayed.

Further, if a search button 63 is selected, a keyword input window may be displayed and the user may input a search word to the keyword input window to perform a search. For example, a search result may include an application having a name corresponding to a search word or include an application list with an access right to information type corresponding to the search word.

Further, the user may not set the access right level one by one but may set the access right of the application by other schemes. The present example embodiment will be described with reference to FIGS. 7A-7B.

Like the edit UI screen of FIG. 7A, if the user operation of selecting an access right calling button 64 in a state in which the modification of the access right of the calendar application is activated is input, as illustrated in FIG. 7B, a screen 700 which may select the access rights preset and stored may be displayed. As illustrated in FIG. 7B, if an OK button 74 is selected in the state in which Macro 4 is selected, the access right of the calendar application is modified as the access right corresponding to the Macro 4. The user may select button 710, 720, or 730 to select other preset access rights.

According to the present example embodiment, when the type of the information of which the access right level needs to be set is numerous, the user does not necessarily need to set the access right levels for each information one by one but may call the preset access right to easily set the access right of the application.

Meanwhile, FIG. 1 illustrates the configuration of the terminal device including the input 110, the display 120, and the controller 130. Depending on the example embodiment, the terminal device 100 may further include various components.

Figure 8:
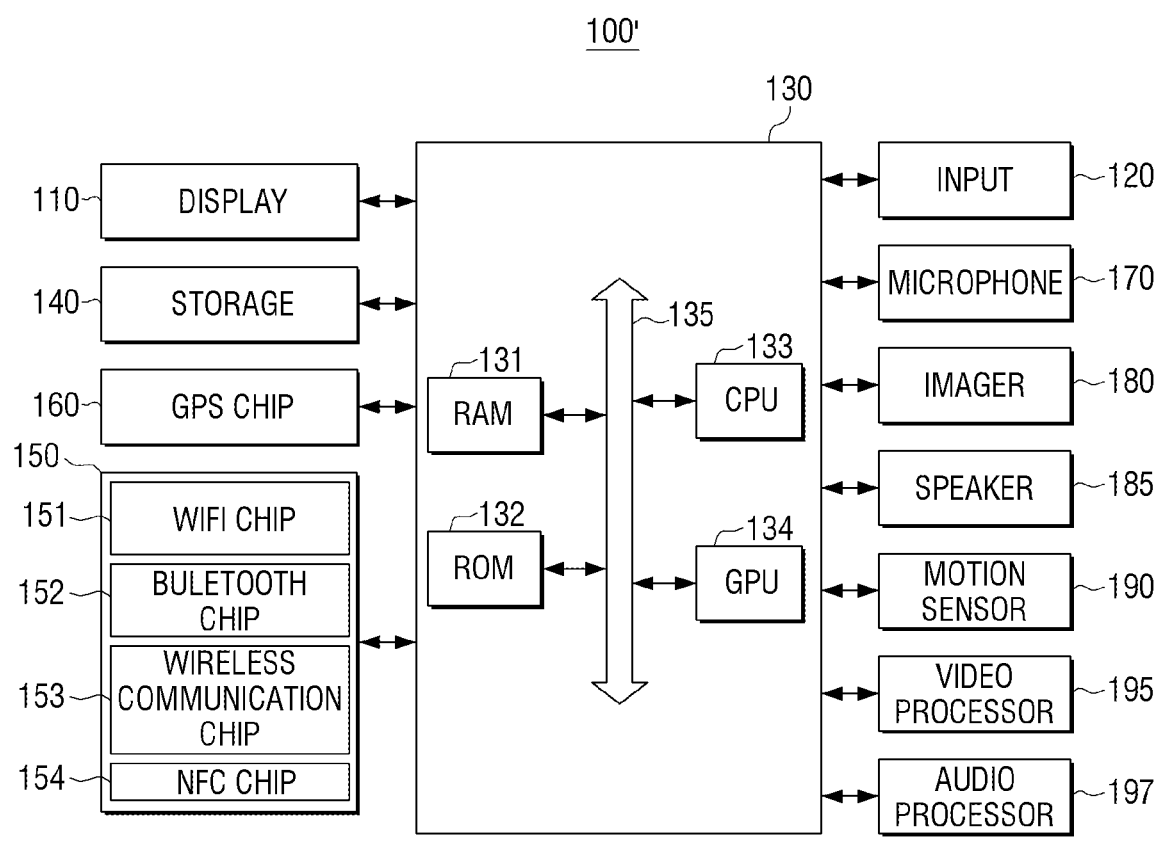
FIG. 8 is a block diagram illustrating an example configuration of a terminal device according to another example embodiment of the present disclosure.

FIG. 8 is a block diagram illustrating an example configuration of a terminal device 100' according to another example embodiment of the present disclosure.

Referring to FIG. 8, the terminal device 100' may include the display (e.g., including a display panel) 110, the input (e.g., including input circuitry) 120, the controller (e.g., including processing circuitry) 130, a storage 140, a communicator (e.g., including communication circuitry) 150, a GPS chip 160, a microphone 170, an imager (e.g., including a camera) 180, a speaker 185, a motion sensor 190, a video processor (e.g., including video processing circuitry) 195, and an audio processor (e.g., including audio processing circuitry) 197.

The display 110 may be implemented as various types of displays such as a liquid crystal display (LCD), an organic light emitting diode (OLED) display, and a plasma display panel (PDP), or the like. The display 110 may include a driving circuit which may be implemented in forms of an a-si TFT, a low temperature poly silicon (LTPS) TFT, an organic TFT (OTFT), etc., a backlight unit, or the like.

The input 110 is configured to receive the user operation and may include various types or input circuitry, such as, for example, a mechanical button, a touch pad, and a wheel which are formed in any of a front part, a side part, a rear part, etc., of an appearance of a main body of the terminal device 100'.

The display 110 and the input 120 may be combined with each other and thus may implement a touch screen. In this example, the touch screen may include a touch sensor for sensing a touch gesture of a user. The touch sensor may be implemented by various types of sensors such as a capacitive type sensor, a resistive type sensor, and a piezoelectric type sensor. The capacitive type uses a scheme of calculating touch coordinates by sensing micro electricity excited to a user's body when a portion of the user's body is touched on a surface of the touch screen, using the dielectric substance coated on the surface of the touch screen. The resistive type includes two electrode plates embedded in the touch screen and uses a scheme of calculating touch coordinates by sensing a flow of current due to a contact between the upper and lower plates at a touched point when the user touches the screen.

The storage 140 may store various programs and data required to operate the terminal device 100'.

The controller 130 uses programs and data stored in the storage 140 to perform a control corresponding to the user operation input through the input 110. For example, if the user operation of moving the UI element to the security region is input, the controller 130 may change the access right of the application corresponding to the moving UI element to the access right set in the security region.

The controller 130 includes, for example, an RAM 131, a ROM 132, a CPU 133, a graphic processing unit (GPU) 134, and a bus 135. The RAM 131, the ROM 132, the CPU 133, the GPU 134, etc., may be connected to each other through the bus 135.

The CPU 133 accesses the storage 140 to execute booting using an O/S stored in the storage 140. Further, the CPU 133 executes various operations using various programs, contents, data, and the like which are stored in the storage 140.

A set of commands for system booting is stored in the ROM 132. If a turn on command is input and thus power is supplied, the CPU 133 copies the O/S stored in the storage 140 to the RAM 131 according to the command stored in the ROM 132 and executes the O/S to boot the system. If the booting is completed, the CPU 133 copies the various programs stored in the storage 140 to the RAM 131 and executes the programs copied to the RAM 131 to execute various operations. If the booting of the terminal device 100' is completed, the GPU 134 displays the UI elements corresponding to the applications stored in the storage 140 on the display 110. In detail, the GPU 134 may use an operator (not illustrated) and a renderer (not illustrated) to generate a screen including various objects such as an icon, an image, and a text. The operator operates attribute values, such as coordinate values, forms, sizes, and colors which will be displayed by each object according to a layout of the screen. The renderer generates a screen of various layouts including an object based on the attribute values that are operated by the operator.

The GPS chip 160 is a component for receiving a GPS signal from a global positioning system (GPS) satellite to determine a current position of the terminal device 100'. The controller 130 may provide the current location information of the terminal device 100' to the specific application, or the like. In this example, the controller 130 may process or encrypt location information based on the access right of the specific application to the information and provide the processed or encrypted location information to the specific application.

The communicator 150 is a component for communicating with various types of external devices according to various types of communication schemes. The communicator 150 includes various communication circuitry, such as, for example, a WiFi chip 151, a Bluetooth chip 152, a wireless communication chip 153, and an NFC chip 154. The controller 130 may use the communicator 150 to download applications and may also transmit a variety of information to external devices during while the applications are executed. In this case, the controller 130 may limit an application to transmit information to the external devices based on the access right of the application to the information.

The WiFi chip 151 and the Bluetooth chip 152 each perform communications by a WiFi scheme and a Bluetooth scheme. The WiFi chip 151 or the Bluetooth chip 152 first transmits and receives various connection information such as an SSID and a session key and then performs a communication connection using the various connection information, thereby transmitting and receiving various information. The wireless communication chip 153 may, for example, refer to a chip which performs communication depending on various communication standards such as IEEE, Zigbee, 3rd generation (3G), 3rd generation partnership project (3GPP), long term evolution (LTE), and the like. The NFC chip 154 may, for example, refer to a chip which is operated by a near field communication (NFC) scheme using a band of 13.56 MHz among various RF-ID frequency bands such as 135 kHz, 13.56 MHz, 433 MHz, 860 to 960 MHz, and 2.45 GHz.

The video processor 195 is a component for processing video data which is included in contents received through the communicator 150 or contents stored in the storage 140. The video processor 195 may perform various image processings, such as decoding, scaling, noise filtering, frame rate conversion, and resolution conversion, on the video data.

The audio processor 197 is a component for processing audio data which is included in contents received through the communicator 150 or contents stored in the storage 140. The audio processor 197 may perform various processings such as decoding, amplification, and noise filtering on the audio data.

If the playing application for the multimedia contents is executed, the controller 130 drives the video processor 195 and the audio processor 197 to play the corresponding contents.

The speaker 185 outputs audio data generated by the audio processor 197.

The microphone 170 is a component for receiving a user voice or other sounds and converting the received user voice or other sounds into the audio data. The controller 130 may use the user voice input through the microphone 170 during a call process or convert the user voice into the audio data and store the converted audio data in the storage 140.

The imager 180 is a component for imaging a still image or a moving picture depending on the control of the user. The imager 180 may be implemented in plural, like a front camera and a rear camera.

When the imager 180 and the microphone 170 are provided, the controller 130 may also perform the control operation depending on the user voice input through the microphone 170 or the user motion recognized by the imager 180.

The motion sensor 190 is a component for sensing a motion of the main body of the terminal device 100'. For example, the terminal device 100' may rotate or be inclined in various directions. The motion sensor 190 may use at least one of various sensors such as a geomagnetic sensor, a gyro sensor, an accelerator sensor to sense motion characteristics such as a rotation direction and angle and a gradient.

In addition, although not illustrated in FIG. 8, according to an example embodiment of the present disclosure, the terminal device 100' may further include an USB port to which an USB connector may be connected, various external input ports for connecting to various external terminals such as a headset, a mouse, and an LAN, a digital multimedia broadcasting (DMB) chip receiving and processing a DMB signal, various sensors, etc.

Figure 9:
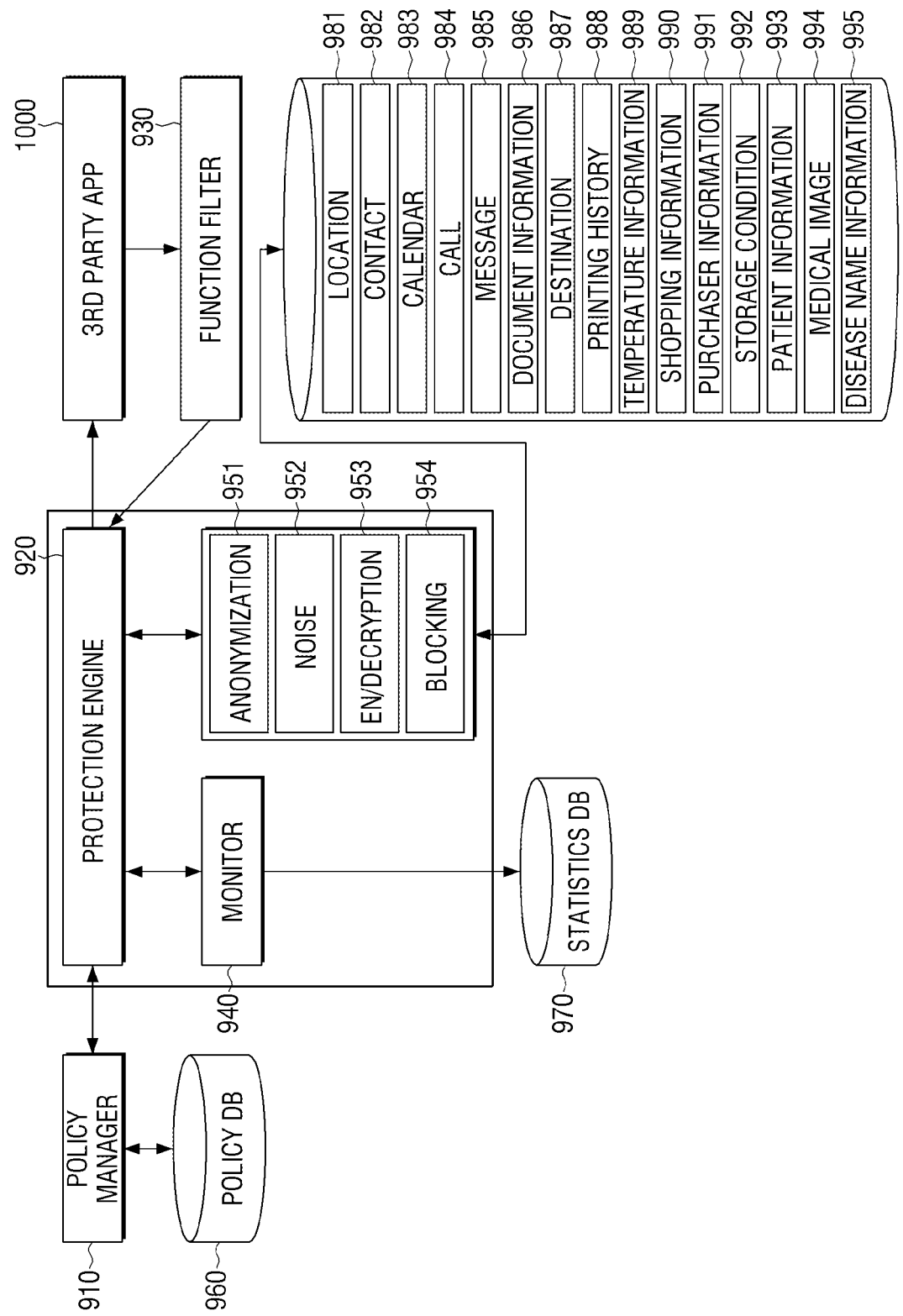
FIG. 9 is a diagram illustrating an example software structure stored in a storage of the terminal device according to an example embodiment of the present disclosure.

Meanwhile, as described above, the storage 140 may store various programs. FIG. 9 is a diagram illustrating an example structure of software stored in the storage 140 according to an example embodiment of the present disclosure.

Referring to FIG. 9, the storage 140 stores a security policy management module 910. The security policy management module 910 may, for example, refer to a module for managing the information on the access right of the application to the information stored in the terminal device 100'. For example, if the user inputs the setting of the access right of the application through the input 110, the security policy management module 910 stores the input setting of the access right to a security policy database 960.

For example, the access right level, the access right information type, or the like to be applied to the specific application are stored in the security policy database 960.

If a function filter (or hooking module) 930 senses that a 3rd party application 1000 accesses the specific information stored in the storage 140, for example, if the function filter 930 senses that the application 1000 calls a specific application programming interface (API), the function filter 930 transmits information such as package ID, subject ID, or the like for identifying the application 1000 to the security engine module 920. Hereinafter, the case in which the specific information requested by the application 1000 is location information 981 will be described as an example.

The security engine module 920 identifies the application 1000 and identifies that the information type requested by the application 1000 is the location information, based on the information transferred by the function filter 930. Further, the security engine module 920 requests the access right level of the application 1000 to the location information 981 to the security policy management module 910.

Further, the security policy management module 910 may provide the location information 981 to the application 1000 as it is or process the location information 981 and provide the processed location information 981 to the application 1000 depending on the access right level of the application 1000 to the location information 981 or prevent the location information 981 from being provided to the application 1000.

For example, if the access right level of the application 1000 to the location information 981 is the first level, the security engine module 920 provides the location information 981 to the application 1000 without limit. If the access right level of the application 1000 to the location information 981 is the second level, the security engine module 920 uses an anonymization module 951 to provide information other than information which may identify the user among the information included in the location information 981 to the application 1000.

If the access right level of the application 1000 to the location information 981 is the third level, the security engine module 920 uses a noise module 952 to perform noise processing on the location information 981 and provide the noise-processed location information 981 to the application 1000. For example, the noise-processed location information 981 is information which may identify only the approximate location of the terminal device 100'. If the access right level of the application 1000 to the location information 981 is the third level, the security engine module 920 uses an encryption/decryption module 953 to encrypt the location information 981 and provide the encrypted location information 981 to the application 1000. If the access right level of the application 1000 to the location information 981 is the fourth level, the security engine module 920 uses a blocking module 954 to prevent the location information 981 from being provided to the application 1000.

In addition, the security engine module 920 may modulate information requested by the application 1000, for example, modulate the information into fake information, information to which noise is added, or the like to provide the modulated information.

Further, the security engine module 920 uses a monitor module 940 to store the access attempt history of the application 1000 to the location information 981 in an information access attempt history database 970 and manages the history.

Although the case in which the access to the location information 981 is requested is described above as an example, the same goes for the case of requesting an access to contacts information 982, scheduling information 983, call record information 984, messages information 985, document information 986, a destination 987, a print history 988, temperature information 989, shopping information 990, purchaser information 991, a storage condition 992, patient information 993, a medical image 994, disease name information 995, or the like.

As described above, according to various example embodiments of the present disclosure, the user may prevent and/or avoid the leakage of the information stored in the terminal device in spite of himself/herself without going through the complicated setting and manage the information based on various access right levels. Hereinafter, a flow chart of a method for protecting information of a terminal device according to some of the example embodiments of the present disclosure will be described.

Figure 10:
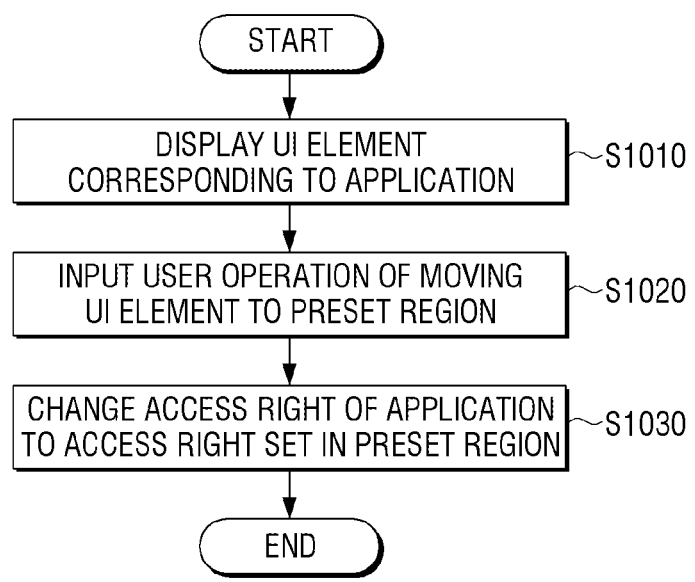
FIGS. 10 to 11 are flow charts illustrating an example method for protecting information of a terminal device according to various example embodiments of the present disclosure.

FIG. 10 is a flow chart illustrating an example method for protecting information of a terminal device according to an example embodiment of the present disclosure.

Referring to FIG. 10, the terminal device 100 displays the UI element corresponding to the application (S1010). For example, the terminal device 100 may display the UI element of the application stored in the terminal device 100 on the screen called a home screen.

Further, the terminal device 100 receives the user operation of moving the displayed UI element to the preset region (S1020). The user operation may be a drag operation or an operation of tapping the UI element to move to the preset region.

The preset region may correspond to an icon, a widget, a page screen different from a page screen on which a UI element is displayed, or a folder icon including a UI element of an application of which the access right is changed. Further, the preset region may have different forms depending on the access right level set in the preset region.

If the user operation is input, the terminal device 100 changes the access right of the application to the information pre-stored in the terminal device 100 to the access right set in the preset region (S1030). In this example, the change may be immediately made or the alarm window (for example, alarm window including a "high security level" message) displaying the information on the access right set in the preset region is displayed and then the change may be made. Alternatively, the UI screen for finally confirming the access right set in the preset region is displayed and the final confirmation by the user is made then the change may be made. In this case, the user may also modify the access right set in the preset region through the UI screen.

Meanwhile, the terminal device 100 continuously displays the UI element at the existing location even after the UI element moves to the preset region. Further, an identifier notifying that the access right of the application corresponding to the moving UI element is changed may be displayed along with the UI element. By doing so, the user may understand that what the corresponding application accesses the information stored in the terminal device 100 is limited by some other ways.

Meanwhile, according to another example embodiment of the present disclosure, if the user operation of moving the UI element to the preset region is input, the terminal device 100 may display the UI screen which may check and/or modify the access right of the application to the information stored in the terminal device 100. The user may check and modify the access right level of the application through the displayed UI screen.

Figure 11:
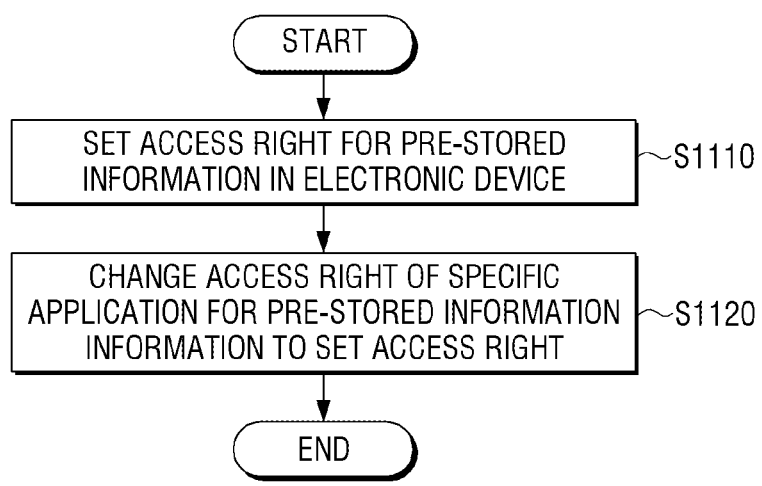

FIG. 11 is a flow chart illustrating an example method for protecting information of a terminal device according to another example embodiment of the present disclosure.

Referring to FIG. 11, the access right to the information pre-stored in the terminal device 100 is set in the terminal device 100 (S1110). For example, the user may set the access right to the information stored in the terminal device 100 through the UI provided from the terminal device 100. In detail, the access right levels for each information type may be set.

Further, the terminal device 100 changes the access right of the specific application to the information stored in the terminal device 100 to the access right set as descried above (S1120).

For example, the change may be performed by the following scheme. First, if the user sets the access right through the UI screen as described above, the terminal device 100 displays a UI element (first UI element) corresponding to the set access right on the display 110. Further, if the user operation of moving a UI element (second UI element) corresponding to the specific application to the first UI element displayed on the display 110 is input, the terminal device 100 changes the access right of the specific application to the set access right. The detailed content of the change of the access right depending on the movement of the UI element is described above with reference to FIGS. 1 to 9, and therefore the overlapping description thereof will be omitted.

Meanwhile, as described above, after the access right of the application is changed, the terminal device 100 may limit the access to the information depending on the changed access right when the application attempts to access the information by various schemes. For example, the terminal device 100 may limit the application to access the information by at least one of the scheme of providing only some of the information requested by the application to the application, the scheme of encrypting the information requested by the application and providing the encrypted information to the application, the scheme of blocking the information requested by the application from being provided to the application, and the scheme of modulating the information requested by the application and providing the modulated information to the application.

In connection with the scheme of modulating the information, for example, when the application requests the location information of the terminal device 100, the terminal device 100 may provide location information completely different from the actual location to the application. Alternatively, for example, when the application requests phone book information stored in the terminal device 100, the terminal device 100 may change 'Min Soo Kim' that is an actual name described in the phone book to 'Gil Dong Hong' and provide it to the application. For example, the terminal device 100 may provide the fake information or the information to which noise is added to the application to protect the sensitive information of the user.

Meanwhile, the terminal device 100 may store the access attempt history of the application to the information pre-stored in the terminal device 100. Further, when there is the user request, the terminal device 100 may provide the stored history through the display 110. Therefore, the user may understand what information any application attempts to access and how often the application attempts to access the information.

In addition to the example embodiments described with reference to FIGS. 10 and 11, various operations for protecting information to be accessed by an application to be described below with reference to FIGS. 1 to 12 and FIGS. 12 to 14 to be described below may be performed but the illustration and description of the detailed flow chart of each of the example embodiments will be omitted.

FIGS. 12A-12, 13A-13D and 14A-14E are diagrams illustrating an example method for setting an access right of an application according to another example embodiment of the present disclosure.

In FIG. 12, the terminal device 100 of the present disclosure may be, for example, an image forming apparatus (for example, printer) 1200.

Referring to FIG. 12A, the controller 130 may display a UI screen 1210 for generating a security region on the display 110. The UI screen 1210 may provide a menu for a user to select whether to generate a security folder. In FIG. 12A, if the user accepts the generation of the security folder, as illustrated in FIG. 12B, the controller 130 may control the display 110 to display an access right setting UI screen 1220 which may set an access right level in detail.

The access right may be set for various information. For example, when the terminal device 100 is the image forming apparatus, the access right to information such as a printing document, a recipient (for example, e-mail, telephone number, IP address, MAC address, or the like), a printing history (for example, identification information of printing document, printing time, the number of printing sheets, or the like) may be set at various levels. According to an example, the access right level may be divided into four levels.

If the access right level is set at the first level, the application may access the information without limit.

If the access right level is set at a second level, the controller 130 may provide some of the information requested by the application to the application.

For example, if the application requests the access to the printing history, the controller 130 may provide one of the identification information of the printing document, the printing time, the number of printing sheets to the application.

Alternatively, if the application requests the access to the printing history, the controller 130 may provide only some of the identification information of the printing document to the application. For example, if the identification information of the printing document is 'test.pdf' as a file name, the controller 130 may provide only 'pdf', which is an extension of a file name of the printing document, to the application.

Alternatively, if the application requests the recipient to which the scanned document will be transmitted, the controller 130 may provide only some of the recipient to the application. For example, if the recipient is 16 Batchelder Rd, Marblehead, Mass., and USA, the controller 130 may provide only the Marblehead, the MA, and the USA to the application.

Alternatively, if the application requests the printing document, the controller 130 may provide only some of the printing document to the application. For example, if the printing document includes both of the text and the image, the controller 130 may provide only the text of the printing document to the application. On the other hand, the controller 130 may also provide only the image of the printing document to the application. According to an example embodiment of the present disclosure, complete information may not be provided to the application and therefore the sensitive portion to the user in the information may be protected.

If the access right level is set at a third level, the controller 130 may encrypt the information requested by the application and provide the encrypted information to the application.

For example, if the application requests an access to the printing history, the printing document, or the recipient as described above, the controller 130 may encrypt the information and provide the encrypted information to the application.

If the access right level is set at a fourth level, the controller 130 may entirely prevent the application from being accessed to the information.

According to various example embodiments of the present disclosure, the information may be stored in an external device of the terminal device 100. When the terminal device 100 is the image forming apparatus, the external device may be, for example, a server (or cloud server) connected to the terminal device 100 through a network, a PC, a laptop PC, a smart phone, a tablet PC, or the like. In this example, the controller 130 may block communication with the external devices to prevent the application from being accessed to the information. For example, the controller 130 may use a firewall to block communication, block a communication port connected to the external devices, or deactivate a function of performing the communication with the external devices.

The user may control the above-mentioned access right levels based on the UI provided by the access right setting UI screen 1220. To this end, for example, a plurality of radio buttons corresponding to each of the pre-stored information as illustrated in FIG. 12B may be provided. In this example, the user may select one of the plurality of radio buttons to determine the access right levels for each of the pre-stored information.

For example, as illustrated in FIG. 12B, an access right setting button 1231 selected for the printing document 1221 may correspond to the first level, an access right setting button 1232 for the recipient 1222 may correspond to the second level, and an access right setting button 1233 for the printing history 1223 may correspond to the third level.

If the access right setting is completed, as illustrated in FIG. 12C, a folder icon 1241 in which the access right is set may be generated. In this example, an identifier 1241-1 notifying that the access right is set may be together displayed around the folder icon in which the access right is set. Meanwhile, the setting of the access right to the so generated security folder may also be modified by the following user operation later.

If the folder icon 1241 is generated as the security region, the user may use the generated folder icon 1241 to change one application to the preset access right.

For example, in FIG. 12C, if a user operation of selecting (for example, holding beyond a predetermined time after the touch) a UI element 1251 of B application is input through the input 120, as illustrated in FIG. 12D, a UI screen 1260 including folder icons in which the UI element 1251 of the B application may move may be displayed. In this case, the UI screen 1260 may include the folder icon 1241 in which the access right generated in FIGS. 12A and 12B is set.

In FIG. 12D, if a user operation of selecting the folder icon 1241 in which the access right is set is input, as illustrated in FIG. 12E, the UI element 1251 of the B application may be included in the folder icon 1241. In this case, the access right set in FIG. 12B may be applied to the application corresponding to the UI element 1251 included in the folder icon 1241.

Meanwhile, even when the UI element 1251 of the B application is included in the folder icon 1241, the UI element 1251 of the B application may remain at the existing location as it is. In this case, the identifier 1251-1 notifying that the accessible right of the B application to the information is changed may also be displayed along with the UI element 1251 of the B application.

In FIG. 13, the terminal device 100 of the present disclosure may be, for example, a food storage apparatus (for example, refrigerator).

Referring to FIG. 13A, the controller 130 may display a UI screen 1310 for generating a security region on the display 110. The UI screen 1310 may provide a menu for a user to select whether to generate a security folder. In FIG. 13A, if the user accepts the generation of the security folder, as illustrated in FIG. 13B, the controller 130 may control the display 110 to display an access right setting UI screen 1320 which may set an access right level in detail.

The access right may be set for various information. For example, if the terminal device 100 is the food storage apparatus, an access right to information such as storage temperature, shopping history (for example, purchase articles, purchase date, purchase place, or the like), purchaser information (for example, purchaser name, card issuing place of a purchaser, card number of a purchaser, card effective date of a purchaser, or the like), a food storage condition (for example, storage food, food carrying out/in date, carried out/in food, storage time, or the like) may be set at various levels. According to an example, the access right level may be divided into four levels.

If the access right level is set at the first level, the application may access the information without limit.

If the access right level is set at a second level, the controller 130 may provide some of the information requested by the application to the application.

For example, if the application requests the shopping history, the controller 130 may provide one of the purchase article, the purchase date, or the purchase place to the application.

Alternatively, if the application requests the access to the purchaser information, the controller 130 may provide only some of the purchaser information to the application. For example, if the purchaser information is the card number of the purchaser, the controller 130 may provide only some of the card number to the application.

Alternatively, if the application requests the access to the information on the food storage condition, the controller 130 may provide only one of the storage food, the food carrying out/in date, the carried out/in food, and the storage time to the application.

Alternatively, if the application requests an access to the storage temperature, the controller 130 converts the storage temperature into context information and provides the context information to the application. For example, if a temperature of a storage chamber of the terminal device 100 is 1° C. above zero, the controller 130 may convert it into information 'during the refrigerating' and provide the information to the application. Further, if the temperature of the storage chamber is 5° C. above zero, the controller 130 converts it into information 'during normal temperature' and provides the information to the application. Further, if the temperature of the storage chamber is 3° C. below zero, the controller 130 converts it into information 'during freezing' and provides the information to the application.

If the access right level is set at a third level, the controller 130 may encrypt the information requested by the application and provide the encrypted information to the application.

For example, if the application requests an access to the information on the refrigerating temperature, the shopping history, the purchaser information, or the food storage condition, the controller 130 may encrypt the information and provide the encrypted information to the application.

If the access right level is set at a fourth level, the controller 130 may entirely prevent the application from being accessed to the information.

According to various example embodiments of the present disclosure, the information may be stored in an external device of the terminal device 100. If the terminal device 100 is home appliances such as the food storage apparatus, the external device may be, for example, a home server, a gateway, a set top box, or the like which are connected to the terminal device 100 through the network. In this example, the controller 130 may block the communication with the external devices to prevent the application from being accessed to the information.

The user may control the above-mentioned access right levels based on the UI provided by the access right setting UI screen 1320. To this end, for example, a plurality of bars corresponding to each of the pre-stored information as illustrated in FIG. 13B may be provided. In this example, the user may select one of the plurality of bars to determine the access right levels for each of the pre-stored information.

In FIG. 13B, an access right setting bar 1331 for storage temperature 1321 may correspond to the second level, an access right setting bar 1332 for a shopping history 1322 may correspond to the third level, an access right setting bar 1333 for user information 1323 may correspond to the first level, and an access right setting bar 1334 for a food storage condition 1324 may correspond to the fourth level.

If the access right setting is completed, as illustrated in FIG. 13C, a folder icon 1341 in which the access right is set may be generated. In this case, an identifier 1341-1 notifying that the access right is set may also be displayed around the folder icon 1341 together. Meanwhile, the setting of the access right to the so generated security folder may also be modified by the following user operation later.

If the folder icon 1341 is generated as the security region, the user may use the generated folder icon 1341 to change one application to the preset access right.

For example, in FIG. 13C, if a user operation of moving a UI element 1351 of C application to the folder icon 1341 is input, as illustrated in FIG. 13D, the UI element 1351 of the C application may be included in the folder icon 1341.

Meanwhile, even when the UI element 1351 of the C application is included in the folder icon 1341, the UI element 1351 of the C application may remain at the existing location as it is. In this example, an identifier 1351-1 notifying that the accessible right of the C application to the information is changed may also be displayed along with the UI element 1351 of the C application.

In FIG. 14, the terminal device 100 of the present disclosure may be, for example, a medical imaging apparatus (for example, ultrasonic imaging apparatus, X-ray imaging apparatus, computed tomography, magnetic resonance imaging apparatus, or the like).

Referring to FIG. 14A, the controller 130 may display a UI screen 1410 for generating a security region on the display 110.

A UI screen 1410 may provide a menu for a user to select whether to generate the security folder. In FIG. 14A, if the user accepts the generation of the security folder, as illustrated in FIG. 14B, the controller 130 may control the display 110 to display an access right setting UI screen 1420 which may set an access right level in detail.

The access right may be set for various information. For example, if the terminal device 100 is the medical imaging apparatus, the access right to information such as patient information, a medical image, diseases name information, and location information may be set at various levels. According to an example, the access right level may be divided into four levels.

If the access right level is set at a first level, the application may access the information without limit.

If the access right level is set at a second level, the controller 130 may provide some of the information requested by the application to the application.

For example, if the application requests the patient information, the controller 130 may provide one of information such as a patient name, a patient age, a patient sex distinction, a patient height, and a patient weight to the application.

Alternatively, if the application requests an access to the disease name information, the controller 130 may convert the disease name information into a category (or upper classification) to which the disease name information pertains and provide the category to the application. For example, if the disease name information of the terminal device 100 is 'lung cancer', the controller 130 converts it into information 'cancer' and provides the information to the application.

Alternatively, if the application requests the medical image, the controller 130 may convert a resolution of the medical image or apply an image filter and provide it to the application. For example, the controller 130 may reduce the resolution of the medical image or provide a blurred image to the application.

If the access right level is set at a third level, the controller 130 may encrypt the information requested by the application and provide the encrypted information to the application.

For example, if the application requests an access to the information such as the patient information, the medical image, the location information, and the disease name information, the controller 130 may encrypt the information and provide the encrypted information to the application.

If the access right level is set at a fourth level, the controller 130 may entirely prevent the application from being accessed to the information.

According to various example embodiments of the present disclosure, the information may be stored in an external device of the terminal device 100. If the terminal device 100 is the medical imaging apparatus, the external device may be, for example, a console, a workstation, a health server, or the like which is connected to the terminal device 100 through the network. In this case, the controller 130 may block communication with the external devices to prevent the application from being accessed to the information.

The user may control the above-mentioned access right levels based on the UI provided by the access right setting UI screen 1420. To this end, for example, the plurality of bars corresponding to each of the pre-stored information as illustrated in FIG. 14B may be provided. In this example, the user may adjust a length of the plurality of bars to determine the access right levels for each of the pre-stored information.

In FIG. 14B, it may be understood that an access right setting bar 1431 for patient information 1421 may correspond to the first level, an access right setting bar 1432 for a medical image 1422 may correspond to the second level, an access right setting bar 1433 for disease name information 1423 may correspond to the third level, and an access right setting bar 1434 for location information 1424 may correspond to the fourth level.

If the access right setting is completed, as illustrated in FIG. 14C, a folder icon 1441 in which the access right is set may be generated. In this case, an identifier 1441-1 notifying that the access right is set may be together displayed around the folder icon 1441 in which the access right is set. Meanwhile, the setting of the access right to the so generated security folder may also be modified by the following user operation later.

If the folder icon 1441 is generated as the security region, the user may use the generated folder icon 1441 to change one application to the preset access right.

For example, in FIG. 14C, there may be a state in which D application is selected. Under the condition, if a user operation of determining a folder in which a UI element 1451 of the selected D application will be stored is input, as illustrated in FIG. 14D, a UI screen 1460 including folder icons in which the UI element of the D application may move may be displayed. In this example, the UI screen 1460 may include the folder icon 1441 in which the access right generated in FIGS. 14A and 14B is set. In this case, if a user operation of moving a highlight to the folder icon 1441 in which the access right is set is input, the folder icon 1441 in which the access right is set may be highlighted. Next, if the user operation of selecting the highlighted folder icon 1441 is input, as illustrated in FIG. 14E, the UI element 1451 of the D application may be included in the folder icon 1441. In this case, the access right set in FIG. 14B may be applied to the application corresponding to the UI element 1451 included in the folder icon 1441.

Meanwhile, even when the UI element 1451 of the D application is included in the folder icon 1441, the UI element 1451 of the D application may remain at the existing location as it is. In this case, an identifier 1451-1 notifying that the accessible right of the D application to the information is changed may also be displayed along with the UI element 1451 of the D application.

The method for protecting information of a terminal device according to various example embodiments of the present disclosure as described above may be stored in a non-transitory readable medium. The non-transitory readable medium may be used while being equipped in various apparatuses.

The non-transitory readable medium stores data therein for a while, such as a register, a cache, a memory, or the like, and may refer to a medium that semi-permanently stores data therein and is readable by a device. For example, the non-transitory readable medium may be a CD, a DVD, a hard disc, a Blueray disc, an USB, a memory card, an ROM, etc.

For example, a program code for executing displaying the UI element corresponding to the application, receiving the user operation of moving the UI element to the preset region, and changing the access right of the application to the information pre-stored in the terminal device to the access right set in the preset region may be provided while being stored in the non-transitory readable medium.

Although the example embodiments of the present disclosure have been illustrated and described hereinabove, the present disclosure is not limited to the above-mentioned specific example embodiments, but may be variously modified by those skilled in the art to which the present disclosure pertains without departing from the scope and spirit of the present disclosure as disclosed in the accompanying claims. These modifications should also be understood to fall within the scope of the present disclosure.

What is claimed is:

1. A method for protecting information of a terminal device, comprising:
    setting an access right for accessing information stored in the terminal device, for a first region on a display;
    displaying a user interface (UI) element representing one application on the display; and
    based on a user input for moving the UI element to the first region being received, changing an access right of the application for accessing information stored in the terminal device to the access right set for the first region,
    wherein, after the changing, the UI element is displayed at a location in which the UI element is displayed before the user input is received.

2. The method as claimed in claim 1, wherein the first region corresponds to one of an icon, a widget, a page screen different from a page screen on which the UI element is displayed, and a folder icon including a UI element of an application of which an access right is changed.

3. The method as claimed in claim 1, wherein, in the displaying of the UI element, an identifier representing the change in the access right of the application is displayed together with the UI element.

4. The method as claimed in claim 1, wherein a form of the first region is dependent on an access right level set for the first region.

5. The method as claimed in claim 1, further comprising:
    displaying an access attempt history of the application for accessing the stored information based on the first region being selected.

6. The method as claimed in claim 1, further comprising:
    displaying a UI screen including information on the access right set in the first region based on the user input for moving the UI element.

7. The method as claimed in claim 6, wherein the changing includes:
    receiving a user input for modifying the access right set for the first region through the UI screen; and
    changing the access right of the application to the modified access right.

8. The method as claimed in claim 1, further comprising:
    displaying a UI screen for modifying the access right of the application for accessing the stored information based on a user input for moving the UI element to a second region being input.

9. The method as claimed in claim 8, further comprising:
    modifying the access right of the application to a selected access right based on an access right provided on the UI screen being selected.

10. The method as claimed in claim 1, further comprising:
    encrypting information requested by the application and providing the encrypted information to the application based on a level of the changed access right being a particular level.

11. The method as claimed in claim 1, further comprising:
    providing only some information requested by the application to the application based on a level of the changed access right being a particular level.

12. The method as claimed in claim 1, further comprising:
    modulating information requested by the application and providing the modulated information to the application based on a level of the changed access right being a particular level.

13. The method as claimed in claim 1, wherein the stored information is one or more of a picture, contacts, a schedule, document information, a destination, a printing history, temperature information, shopping information, purchaser information, a storage condition, patient information, a medical image, disease name information, and information on a location of the terminal device.

14. A terminal device, comprising:
    a display configured to display a user interface (UI) element representing one application;
    an input configured to receive a user input for moving the UI element to a region on the display; and
    a controller configured to:
        set an access right for accessing information stored in the terminal device, for the region; and
        in response to receiving the user input, change an access right of the application for accessing information stored in the terminal device to the access right set for the region,
    wherein, after the access right of the application is changed, the UI element is displayed at a location where the UI element is displayed before the user input is received.

15. A non-transitory recording medium storing a program that, when executed by a computer of a terminal device, causes the computer to perform at least:
    set an access right for accessing information stored in the terminal device, for a first region on a display;
    display a user interface (UI) element representing one application on the display;

receive a user input for moving the UI element to the first region; and in response to receiving the user input, change an access right of the application for accessing information stored in the terminal device to the access right set for the first region, wherein, after the access right of the application is changed, the UI element is displayed at a location where the UI element is displayed before the user input is received.

* * * * *